US011037024B1

(12) United States Patent
Ratti et al.

(10) Patent No.: US 11,037,024 B1
(45) Date of Patent: Jun. 15, 2021

(54) CROWDSOURCED ON-DEMAND AI DATA ANNOTATION, COLLECTION AND PROCESSING

(71) Applicant: Jayant Ratti, New Delhi (IN)

(72) Inventors: Jayant Ratti, New Delhi (IN); Abhishek Bose, New Delhi (IN); Puneet Kashyap, New Delhi (IN)

( * ) Notice: Subject to any disclaimer, the term of this patent is extended or adjusted under 35 U.S.C. 154(b) by 0 days.

(21) Appl. No.: 16/699,408

(22) Filed: Nov. 29, 2019

Related U.S. Application Data

(63) Continuation-in-part of application No. 16/416,225, filed on May 19, 2019, which is a continuation-in-part of application No. 15/919,033, filed on Mar. 12, 2018, now Pat. No. 10,296,794, which is a continuation-in-part of application No. 15/689,350, filed on Aug. 29, 2017, now Pat. No. 9,916,755.

(60) Provisional application No. 62/437,007, filed on Dec. 20, 2016.

(51) Int. Cl.
*G06K 9/62* (2006.01)
*G06N 20/00* (2019.01)
*G06T 7/11* (2017.01)
*G06K 9/32* (2006.01)

(52) U.S. Cl.
CPC ......... *G06K 9/6254* (2013.01); *G06K 9/3241* (2013.01); *G06N 20/00* (2019.01); *G06T 7/11* (2017.01)

(58) Field of Classification Search
CPC .. G06K 9/3241; G06K 9/3233; G06K 9/6254; G06K 9/6255; G06T 7/11; G06N 20/00
USPC ........................................ 382/155–159, 115
See application file for complete search history.

(56) References Cited

U.S. PATENT DOCUMENTS

| | | | |
|---|---|---|---|
| 9,082,018 B1* | 7/2015 | Laska | G06F 3/04845 |
| 2011/0044533 A1* | 2/2011 | Cobb | G08B 13/19613 382/155 |
| 2014/0036076 A1* | 2/2014 | Nerayoff | G06K 9/00791 348/148 |
| 2016/0078759 A1* | 3/2016 | Nerayoff | G06T 7/32 701/3 |

\* cited by examiner

*Primary Examiner* — Nirav G Patel
*Assistant Examiner* — Stephen M Brinich

(57) ABSTRACT

In an aspect of the present disclosure relates to a network involving humans and AI based systems working in conjunction to perform tasks such as traffic violation detection, infrastructure monitoring, traffic flow management, crop monitoring etc. from visual data acquired from numerous data acquisition sources. The system includes a network of electronic mobile devices with AI capabilities, connected to a decentralized network working towards capturing high quality data for finding events or objects of interest in the real world, retraining AI models, for processing the high volumes of data on decentralized or centralized processing units and also being used for the verification of the outputs of the AI models. The system talks about many annotation techniques on smartphones for crowdsourced AI Data Labeling for AI Training.

23 Claims, 21 Drawing Sheets

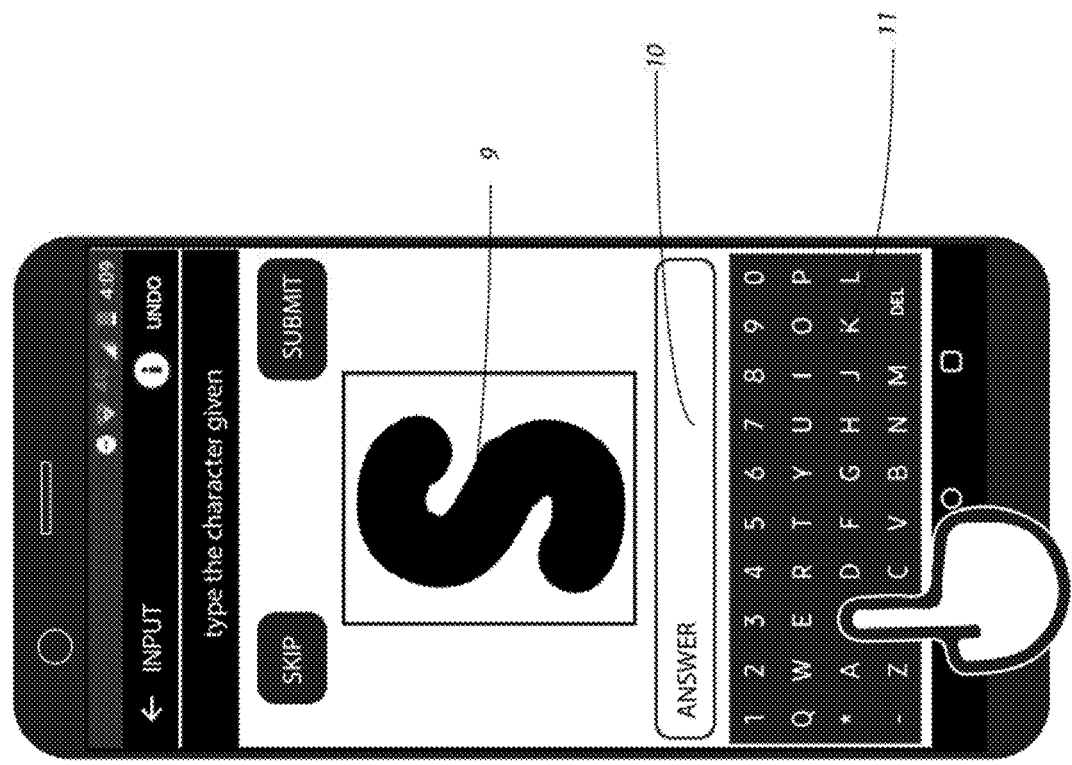

US 11,037,024 B1

CROWDSOURCED ON-DEMAND AI DATA ANNOTATION, COLLECTION AND PROCESSING

CROSS-REFERENCE TO RELATED APPLICATION

This application claims the benefit of the following co-pending patent application which is incorporated herein by reference in its entirety: application Ser. No. 16/416,225 "crowdsourced on-demand artificial intelligence roadway stewardship system" filed on May 19, 2019, which is the continuous-in-part application of U.S. application Ser. No. 15/919,033 "On-Demand Artificial Intelligence and Roadway Stewardship System" filed on Mar. 12, 2018, now patented U.S. Pat. No. 10,296,794B2 issued on 21 May 2019, which is the continuous-in-part application of U.S. application Ser. No. 15/689,350 entitled "On-demand Roadway Stewardship System" filed on Aug. 29, 2017, patented U.S. Pat. No. 9,916,755 issued on 13 Mar. 2018, and, which claims priority from provisional patent application Ser. No. 62/437,007, filed on Dec. 20, 2016.

FIELD OF DISCLOSURE

The present disclosure relates to artificial intelligence (AI) and neural networks. More specifically relates an autonomous crowdsourced on-demand AI powered stewardship network.

BACKGROUND

The background description includes information that may be useful in understanding the present invention. It is not an admission that any of the information provided herein is prior art or relevant to the presently claimed invention, or that any publication specifically or implicitly referenced is prior art.

A moving violation is any violation of the law committed by the driver of a vehicle while it is in motion. The term "motion" distinguishes it from other motor vehicle violations, such as paperwork violations (which include violations involving automobile insurance, registration and inspection), parking violations, or equipment violations. Moving violations often increase insurance premiums.

Yet another prior art reference CN105608318A provides a method that utilizes a several parameters such as regularization parameter, spacing distance hyper parameter, an annotator voting weight, and a difference between the number of times that annotators annotate a current prediction item as a corresponding estimate and the number of times that annotators annotate the current prediction item as a subcategory. As claimed in the patent, these parameters are much more superior than majority voting in order to ensure that good quality and reliable data leaves the consensus based network. This patent doesn't talk about complementing AI outputs of AI models using a public consensus based system both from the standpoint of AI model evaluation and for correcting the data for a product level delivery. It also doesn't talk about the different kinds of annotation approaches which can be done on a mobile device, along with performing AI on mobile (edge) devices.

Still another prior-art reference CN108898225A provides a labeling method based on human-cooperative. This invention talks about generating template data using a domain expert for training a specialist for the task of data annotation. The template data or gold data stated in this patent is necessary to understand what is the quality of annotated data which the specialists create. Reliability of annotated data is extremely important because it is imperative that only good quality data moves to our AI engines for retraining. Although this patent talks about improving crowd-sourced data using different methodologies, it doesn't talk about using crowd based consensus technology to vet the output of AI models and evaluate its performance. Unlike our patent which talks about crowd vetting to improve the outputs generated by the AI models to ensure that the end product is always correct, this patent talks more on the lines of reliability of crowd sourced annotated data.

A US patent application US20150359458A1 titled "Smartphone-based apparatus and method for obtaining repeatable, quantitative colorimetric measurement" describes a smartphone-based, point-of-collection diagnostic system, methods, and components for obtaining consistent colorimetric measurements and analyses regardless of the smartphone platform in use. This method lies more in the field of Biometric testing and does not lie in the field of Smartphone based annotation of visual data for retraining of ML/DL models.

Another prior-art reference U.S. Pat. No. 7,010,751B2 provides software for electronically annotating electronic images, such as drawings, photographs, video, etc., through the drag-and-drop of annotations from a pre-defined, but extendable, list. The annotations are placed at a user-selected X, Y location are stored in a searchable database. Thus, they can be searched in order to retrieve, organize, group, or display desired electronic images or collections of such images. The annotations may be text, images, sounds, etc. The invention provides a flexible, easy to learn, rapid, low error rate and satisfying interface for accomplishing such tasks. This patent talks about annotation of images not focused towards generation of good quality crowd-sourced annotated data for training machine learning models or for evaluating output of machine learning and AI models using a crowdsourced approach, unlike ours. The major point addressed is annotation of photographs and images for easy indexing of information and does not coincide with our methods of interests.

Another prior-art reference RU2562437C2 provides systems and method by which information can be forwarded to a response service, which can return annotated information. An can be attached to the information to create an annotated document. The annotated document can be forwarded to other users. Additionally, the annotated document can be stored in a manner which associates the annotated document with the user who generated or captured the information. The capacity to capture information, obtain an to information and distribute annotated information can enable to generate social media data, such as social network messages or online photo albums. This patent largely talks about annotating data in the form of response to queries. The literature doesn't state anything about using annotated data measure AI/ML model performance or generating annotated data for retraining AI models. The patent focuses on creating a relationship between different activities people do on the internet such as multiple, consecutive searches on the World Wide Web which are considered as separated events.

Another prior-art reference WO2018000269A1 provides techniques for usage of crowdsourcing technology is a distributed problem-solving way. The technology uses the wisdom and strength to solve computer tasks difficult to solve, especially data labeling, object recognition, etc. This very simple for humans, but in terms of computer very difficult task. Many tasks, such as text, image classification, can be posted to the Internet via crowdsourcing platform, marked by regular users from the Internet. Ordinary users to complete tasks and obtain data marked economic rewards provided by the publisher. This patent neither talks specifically about annotating data on mobile devices for retraining AI models nor does it talk about evaluating AI/ML model performance using a consensus based crowd vetted network. The literature also doesn't focus on anything related to preliminary AI compute on edge devices during data acquisition.

A US patent application US20160148168A1 titled "System and method for task distribution in crowdsourcing" discloses a methods and systems for distributing crowdsourcing tasks. The method includes receiving a handshake request, by a host device from a client device, at least for accessing one or more first crowdsourcing tasks, such that the client device has sporadic internet connectivity. Thereafter, in response to the handshake request a message is transmitted by the host device to the client device. The message includes at least an information pertaining to one or more second crowdsourcing tasks received from a crowdsourcing platform server. Further, the one or more first crowdsourcing tasks are transmitted by the host device to the client device. This transmission is based at least on a validation of one or more second responses, received from the client device, associated with the one or more second crowdsourcing tasks. This patent doesn't talk about having AI powered mobile devices connected by a decentralized network and utilizing the power of crowd sourcing and crowd vetting technology to evaluate the performance of AI models Yet another prior-art reference CN104573359A provides a method that involves the following two phenomena: (1) the results of most of the tasks annotated by an annotator with relatively high ability is the same as those of other annotators; (2) the consistency of the results of the tasks with relatively low difficulty and annotated by the annotators is high. According to the method, a novel evaluation method for the task difficulty and an evaluation method for the annotator ability are provided; an integrating method based on the two methods for the crowdsourced data is created; the iteration mode is utilized to fast solve; therefore, the ability evaluation of the annotator can be objective and accurate; the difficulty of various crowdsource tasks can be effectively evaluated conveniently; meanwhile, the method is applicable to crowdsource data of various models, including but not being limited to two-value and multi-value of images, texts, videos and other tasks. This piece of literature talks about integrating crowd-source labels for generating annotated data. It looks into evaluating annotator ability of performing difficult tasks. It doesn't specify anything about vetting the results of AI model using a consensus based network. The patent also doesn't focus on performing AI at the source on edge devices (data acquisition device) for initial evaluation and discarding.

Thus, it may be appreciated form the above that there exists a need to crowdsource data labelling and to provide an improved techniques on how a distributed network can add new classes or creating a neural network model for a new class extremely streamlined. Traditional methods of data annotation include experts in the field of data mining going over large collections of data to understand good quality data which can be used as the ideal set of data for training a neural network. Since a neural network requires a large number of data to give our high confidence scores during training we would need quality data to keep the performance of the neural network consistent. Feeding bad data at any point to the neural network would hamper the accuracies of the model.

The prior-art does not provide any technical or suggestions on how to automate and entire neural network training, testing and re-deployment loop. It is a tedious task to monitor the accuracy of a particular model in production and then replace it with a new model for improved performance. Automating this task requires a streamlined flow of data from the present active classifier to the data reviewers, back to neural network for retraining, accuracy testing and deployment for production. Traditional methods of model redeployment do not include a crowdsourced consensus for the task of data collection and annotation. Traditional methods rely much on data experts for data collection and model parameters monitoring.

Machine Learning and AI methods for performing tasks such as object detection, object classification and segmentation aren't always cent percent accurate. In a production scenario certain cases might arise when the data fed to the system for inference might follow a distribution which doesn't provide perfect output. In such cases it is not affordable to give our wrong information which can be critical. Production scenarios can be generating vehicle violation information, monitoring infrastructure condition such as potholes on roads and relaying notifications, traffic monitoring and ground control etc. which are extremely critical and can face plausible errors in different settings. Hence it is extremely important that an evaluation network is present in order to make sure that the data flowing out of the system is not erroneous.

With the advent of Artificial Intelligence in the modern technology era, classifying and detecting new objects visually in a scene is only limited by the amount of data available for training a particular neural network. Manual methods of annotating visual data required a lot of manpower and time.

Whereas there is certainly nothing wrong with existing system, nonetheless, there still exists a need to provide an efficient, effective and reliable autonomous crowdsourced on-demand AI powered stewardship network that incorporates the capabilities of neural networks for underlying an initial set of results based on which further annotations are performed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range.

Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

Some of the objects of the present disclosure, which at least one embodiment herein satisfies are as listed herein below.

It is a general object of the present disclosure to provide an artificial intelligence based system and method for avoidance of traffic violation that incorporates the capabilities of neural networks for underlying an initial set of results based on which further annotations are performed.

It is another object of the present disclosure to provide an AI based system for detection of objects on the edge/mobile device itself. The initial set of results calculated on the mobile device is then sent out for further processing ensuring high quality outputs.

t is another object of the present disclosure to provide an artificial intelligence based system for detecting traffic violations based on the orientation, position, movement of the vehicles on the road and also based on the signs on the road. The outputs generated are passed through a human based consensus network for ensuring that correct and verified outputs are going out.

It is another object of the present disclosure to provide an artificial intelligence based system for detection illegally parked vehicles in a particular parking slot based on the vehicle orientation and traffic flow direction.

It is another object of the present disclosure to provide an artificial intelligence based system for calculation a speed of said object utilizing object detection signal from the location of the said object in different frames of the video or series of images and the relative velocity of the vehicle installed with the said data collector.

In another object of the present disclosure to provide a human consensus based verification model which works towards evaluating AI performance and generating new data and also towards fixing any erroneous data which goes out of the AI system.

In another object of the present disclosure to provide a human consensus based verification model which evaluates the performance for all AI models. The human consensus base verification works to produce perfect, error-less outputs. The AI models can be of various types which includes object detection, image classification, image segmentation, In another object of the present disclosure to provide AI and human based verification system for infrastructure monitoring. Infrastructure monitoring can include potholes on roads, broken bridges etc.

In another object of the present disclosure to provide AI and human based verification system for traffic management. Real-time traffic alerts can be generated using proper vision based methods.

In another object of the present disclosure to provide AI and human based verification system for security surveillance in both commercial and domestic environments.

In another object of the present disclosure to provide AI and human based verification system for farm and crop monitoring. Data acquisition devices in these kind of scenarios can be drones.

In another object of the present disclosure to provide a distributed network for training AI models. People with a mobile device will be able to use their phone's resources and compute to train AI models and get rewarded in return.

In another object of the present disclosure, the user will get rewarded for capturing the objects or events of interest and correctly annotating and verifying them.

SUMMARY

This summary is provided to introduce a selection of concepts in a simplified form to be further described below in the Detailed Description. This summary is not intended to identity key features or essential features of the claimed subject matter, nor is it intended to be used to limit the scope of the claimed subject matter.

In order to overcome the above problems and to fulfill the expectations of the customers, the objective of the present invention is to an efficient, effective and reliable autonomous crowdsourced on-demand AI powered stewardship network that incorporates the capabilities of neural networks for underlying an initial set of results based on which further annotations are performed.

The present disclosure relates to artificial intelligence (AI) and neural networks. More specifically relates an autonomous crowdsourced on-demand AI powered stewardship network.

An aspect of the present disclosure relates to artificial intelligence (A). In particular, the present disclosure pertains to artificial intelligence based system and method for avoidance of traffic violation.

In an aspect of the present disclosure relates to an electronic device configured with one or more artificial intelligence (AI) algorithms and/or machine learning (ML) algorithms. The system includes one or more processors coupled to the non-transitory storage device and operable to execute the one or more modules.

The one or more routines includes an obtaining module, which when executed by the one or more processors, obtains, based on the one or more AI and/or ML algorithms, at least a combination of objects or events of interest from one or more vision sensing systems, wherein said combination of objects or events of interest comprises at least an image having one or more identifiable objects, and a transmit module, which when executed by the one or more processors, transits the obtained combination of objects or the obtained events of interest to one or more servers.

In an aspect, an electronic mobile device configured with one or more image processing algorithms or artificial intelligence (A) algorithms and/or machine learning (ML) algorithms, the electronic device comprising a non-transitory storage device having embodied therein one or more routines; and one or more processors coupled to the non-transitory storage device and operable to execute the one or more modules, wherein the one or more modules include: a capture module, which comprises one or more Image Processing techniques, which is inferencing or identifying at least a pre-defined combination of objects or events of interest from one or more vision sensing systems; a data storage module, which stores the video or series of one or more images with the desired objects, events of interest; a transmitter module, which when executed by the one or more processors, transmits the obtained combination of objects or the obtained events of interest to one or more servers; and a receiving module, which receives the continuously updated object or events of interest on the electronic mobile device remotely from a server.

In an aspect, the one or more servers are configured to process the obtained combination of objects or the obtained events of interest to generate at least one output.

In an aspect, the one or more AI algorithms and/or ML algorithms are configured to learn automatically and upgrade based on said combination of objects or events of interest.

A server system configured with one or more artificial intelligence (AI) algorithms and/or machine learning (ML) algorithms, the server system comprising scalable infrastructure, which includes a non-transitory storage device having embodied therein one or more routines; and one or more processors coupled to the non-transitory storage device and operable to execute the one or more modules, wherein the one or more modules include a data storage module, which stores the video or series of one or more images with the desired objects, events of interest in form of raw data or verified data; a processing module for breaking down an incoming stream of data packets, which is stored as raw data, by processing into smaller packets and marking data points a transmitter module, which when executed by the one or more processors, transmits the smaller data packets to a network of users for verification of objects or the obtained events of interest from one or more servers; and a receiver module, which receives the verified object or events of interest from electronic mobile devices remotely from a user or the network of users and stores in the data storage module.

In an aspect, the one or more servers are configured to perform a series of AI based inference on the obtained combination of objects or the obtained events of interest, and categorize into data points.

In an aspect, the data points are provided to one or more users for further for further verification. The verification is a consensus based model user human judgment is clubbed together with AI outputs to ensure correctness.

In an aspect, an accurate result of the processing is decided based on consensus from the one or more users.

In an aspect, an accurate result of the processing is decided based on majority voting from the one or more users.

In an aspect, the one or more users receive the data points from the various AI models and the one or more users processes the data points.

In an aspect, the one or more users process the data points by classification and manual annotation techniques.

An annotation module configured to run on an electronic mobile device having a visual display comprises one or more tools to annotate, draw, label or classify the received one or more objects or events of interest from a remote server one or more data labeling techniques for the purpose of training, or re-training AI models; a transmission of the annotated, drawn, labeled and classified objects, areas or events of interest back to a AI learning or training server for deep learning, re-training and other AI inference improvement operations.

In an aspect, the one or more AI algorithms and/or ML algorithms are configured to learn and evolve based on the manual annotations by retraining e one or more AI algorithms and/or ML algorithms with more new data that is pouring into a pool of training data.

In an aspect, the manual annotation techniques are selected from any or combination of Lanes, 2D bounding polygons for various objects, Selection images, Number entry, Road segmentation, and 3D polyhedral shapes for various sides of an object to be detected.

In an aspect, the data points are provided to one or more distributed servers for further processing. This decentralized network includes several computing nodes such as mobile phone, tablets and other edge devices capable of performing operations which are required to train a AI models.

In an aspect, the decentralized compute network removes the load from the central server and reduces cost of maintaining a central server.

Another aspect of the present disclosure relates to a method for detecting objects in images and videos using a single deep neural network. The method can include the steps of: obtaining, based on the one or more AI and/or ML algorithms, at least a combination of objects or events of interest from one or more vision sensing systems, wherein said combination of objects or events of interest comprises at least an image having one or more identifiable objects; transmitting the obtained combination of objects or the obtained events of interest to one or more servers.

In an aspect, the one or more servers are configured to perform a series of AI based inference on the obtained combination of objects or the obtained events of interest, and categorizes into data points, the data points are provided to one or more users for further processing.

In an aspect, an accurate result of the processing is decided based on consensus or majority voting from the one or more users.

In an aspect, the one or more users process the data points by classification and manual annotation techniques.

In an aspect, the one or more AI algorithms and/or ML algorithms are configured to learn and evolve based on the manual annotations by retraining e one or more AI algorithms and/or ML algorithms with more new data that is pouring into a pool of training data.

In an aspect the data points obtained from different sources, processed using AI and verified using a human based consensus network can be cumulatively used for generating maps. These maps will display output of the system such as traffic violations, condition of the infrastructure etc.

Various objects, features, aspects and advantages of the present disclosure will become more apparent from the following detailed description of preferred embodiments, along with the accompanying drawing figures in which like numerals represent like features.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
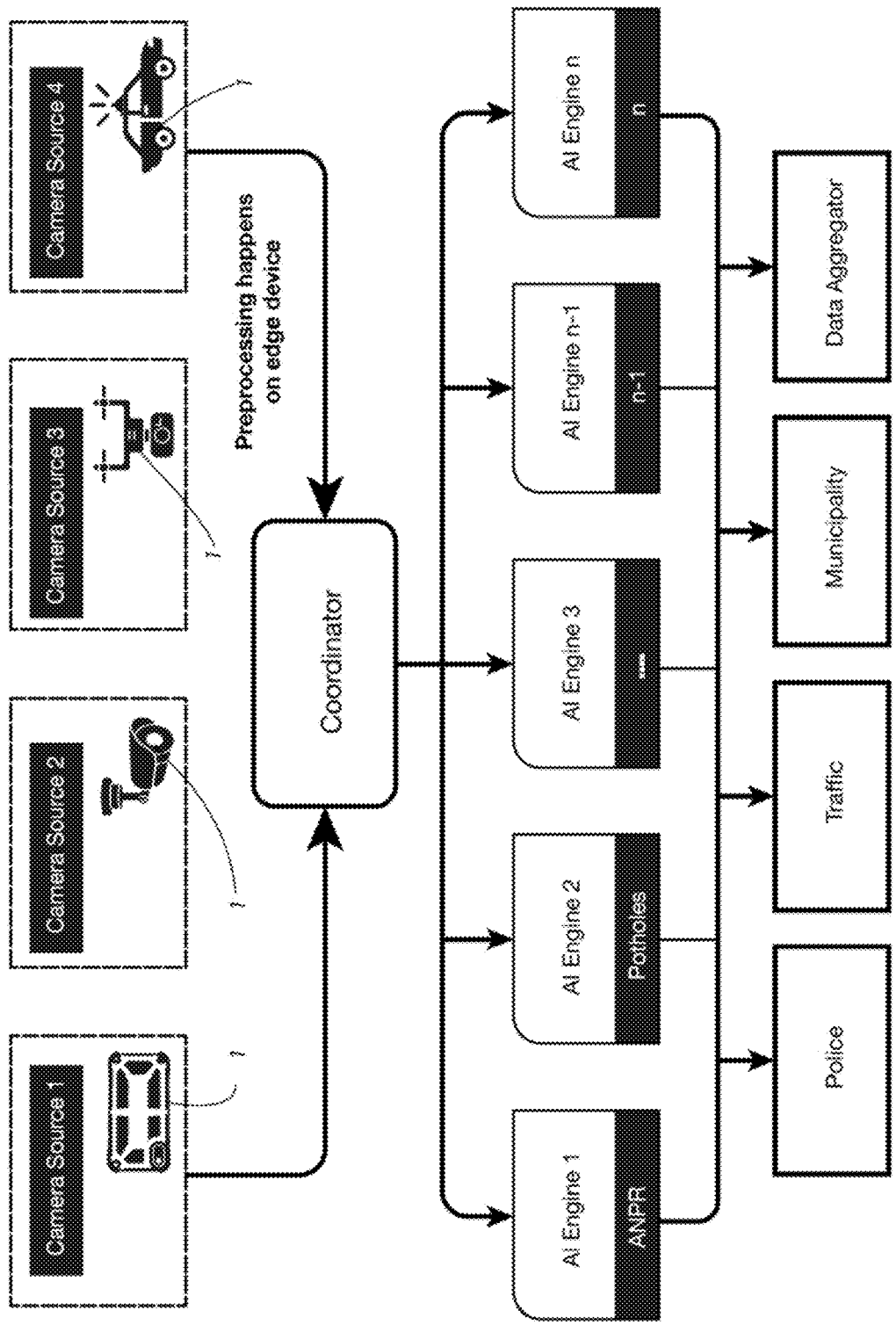

The diagrams are for illustration only, which thus is not a limitation of the present disclosure, and wherein:

FIG. 1 illustrates how video data is continuously flowing from the different video sources, in accordance with embodiments of the present disclosure.

Figure 2:
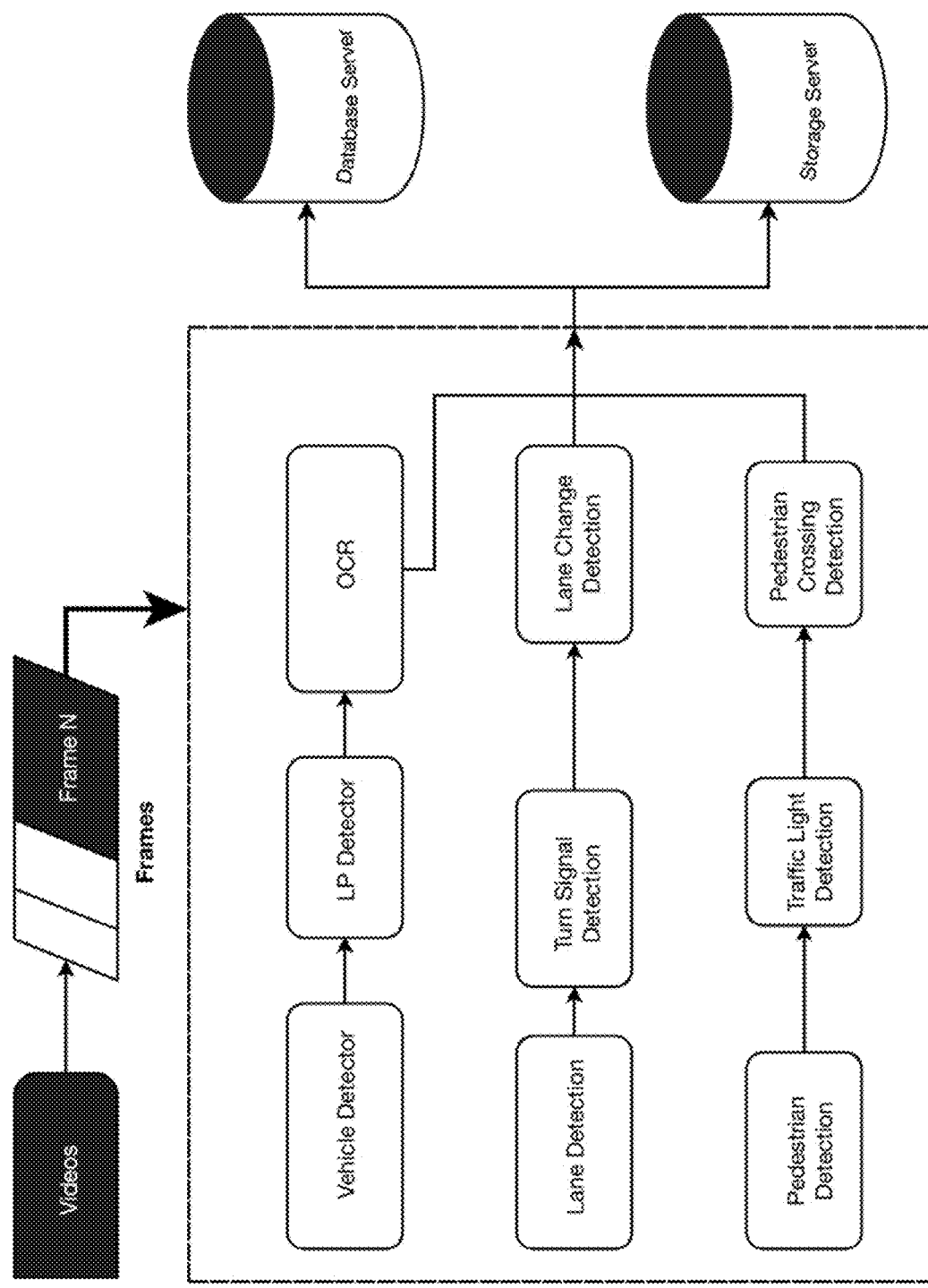

FIG. 2 illustrates how the videos are processed by the AI engines spread across multiple servers, in accordance with embodiments of the present disclosure.

Figure 3:
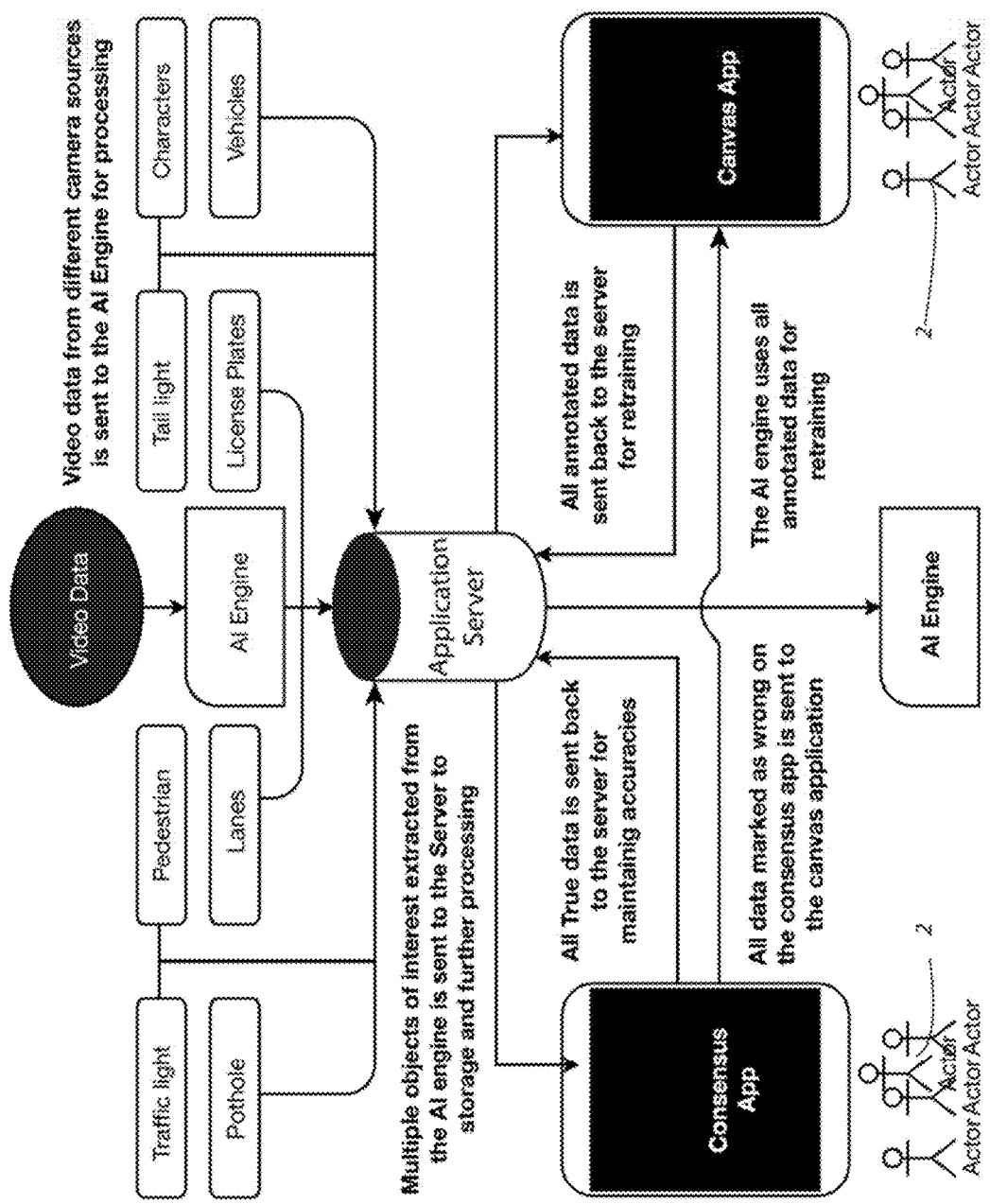

FIG. 3 illustrates how the data is managed and stored into the different folders while being processed and fetched from the consensus and canvas applications, in accordance with embodiments of the present disclosure.

Figure 4:
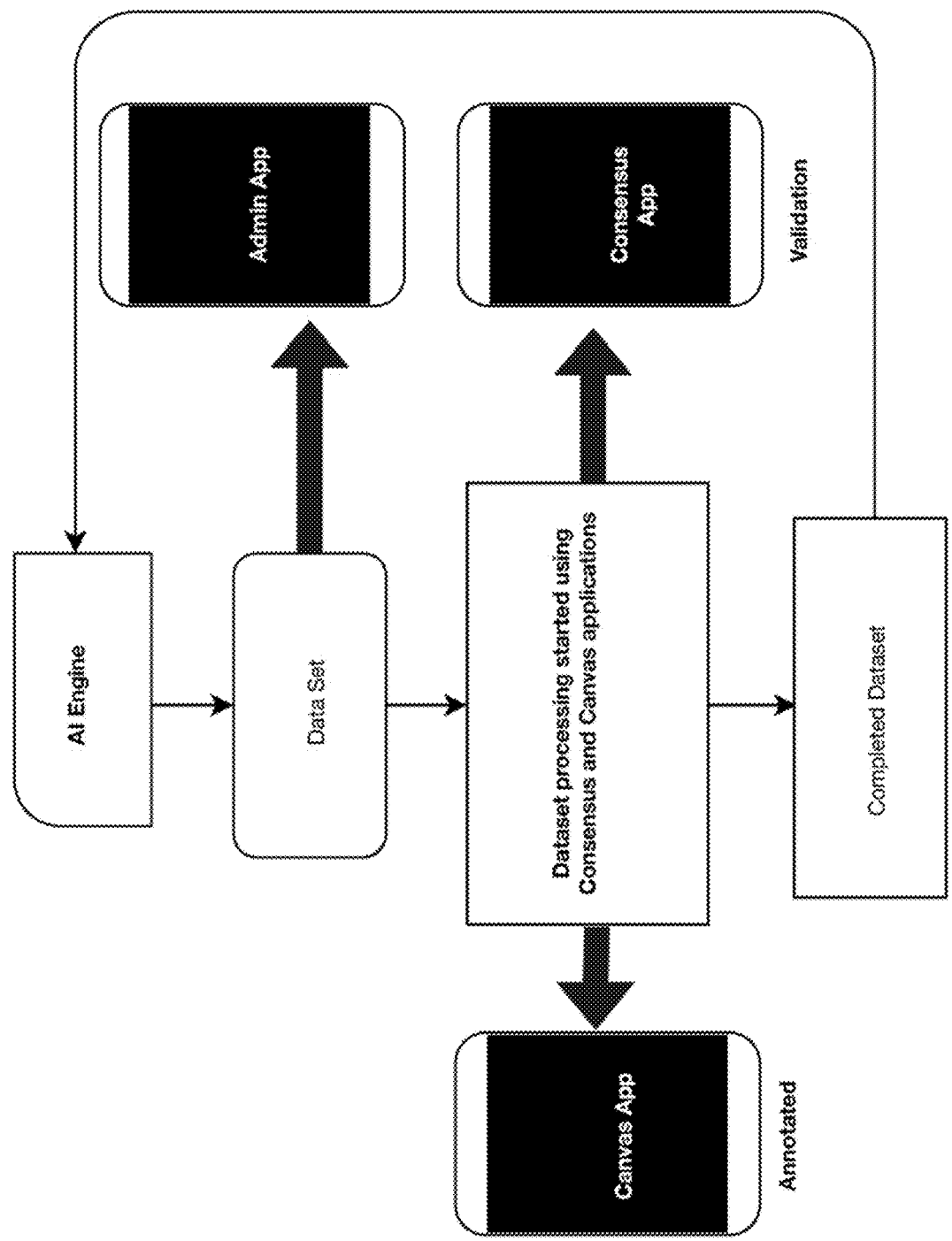

FIG. 4 illustrates a central app known as the admin app which is used by a person to monitor the continuous crowd-sourced annotation process, in accordance with embodiments of the present disclosure.

Figure 5:
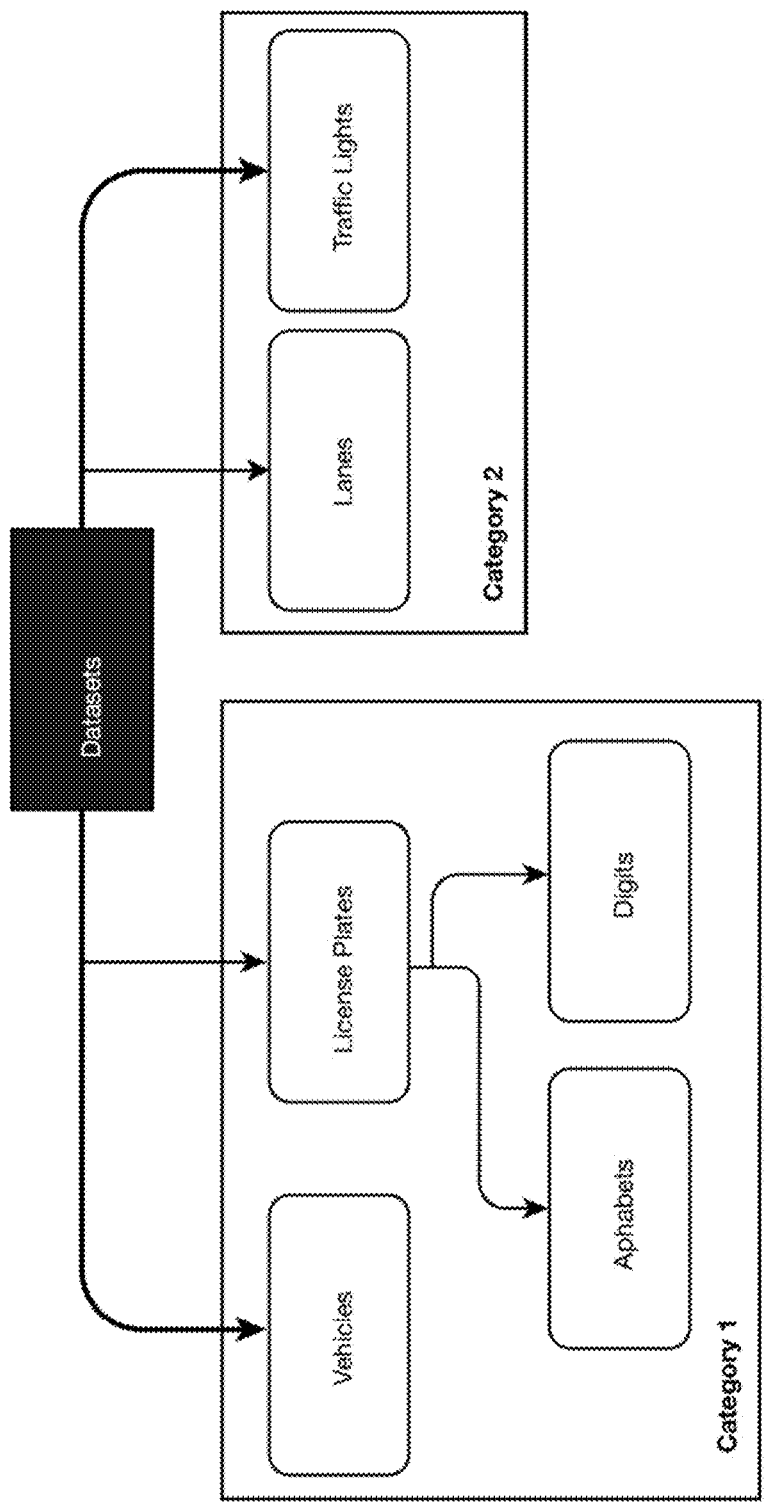

FIG. 5 illustrates datasets are categorized on the server, in accordance with embodiments of the present disclosure.

Figure 6:
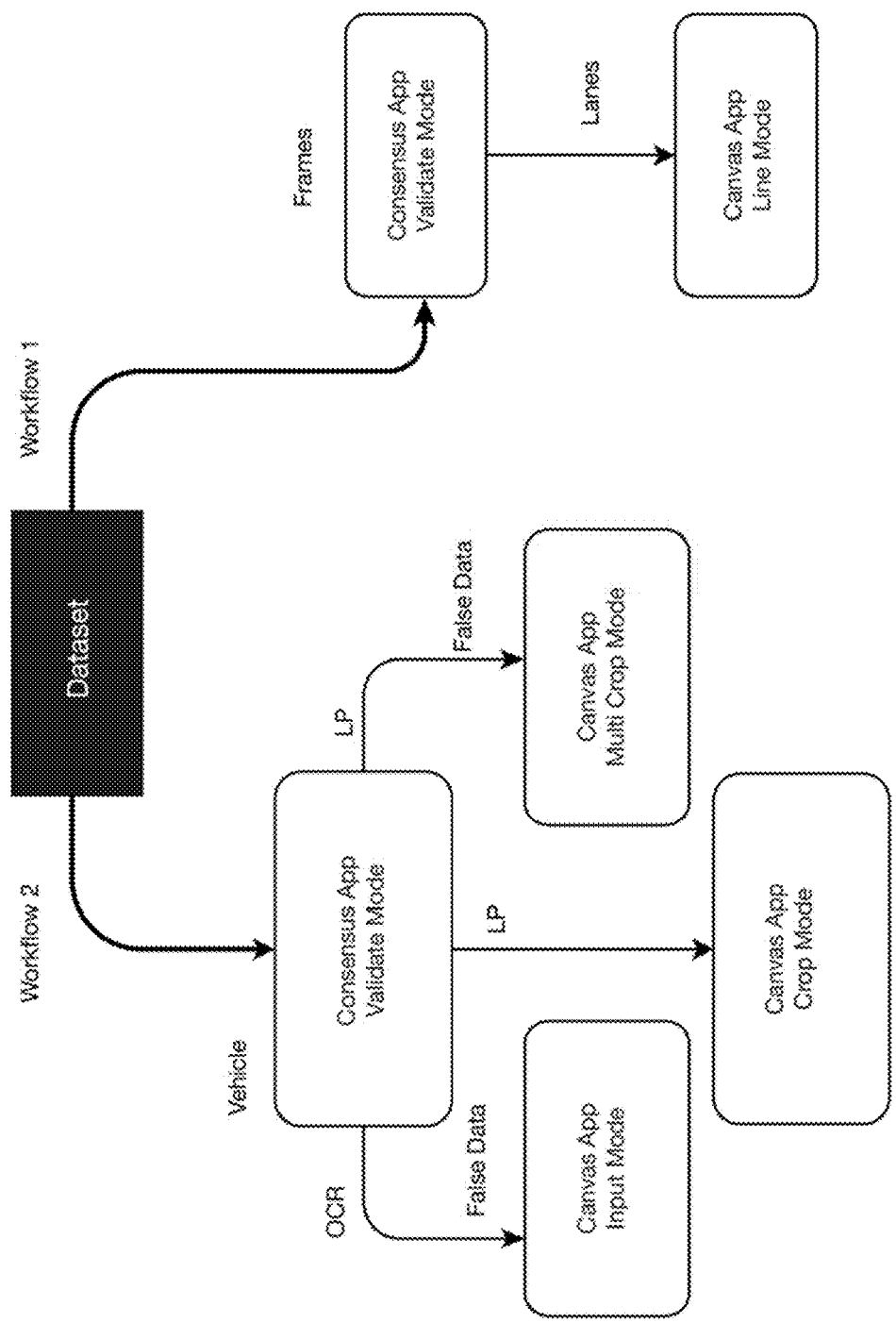

FIG. 6 illustrates workflow deciding how a particular dataset will propagate through the consensus and canvas apps and through which modes, in accordance with embodiments of the present disclosure.

Figure 7:
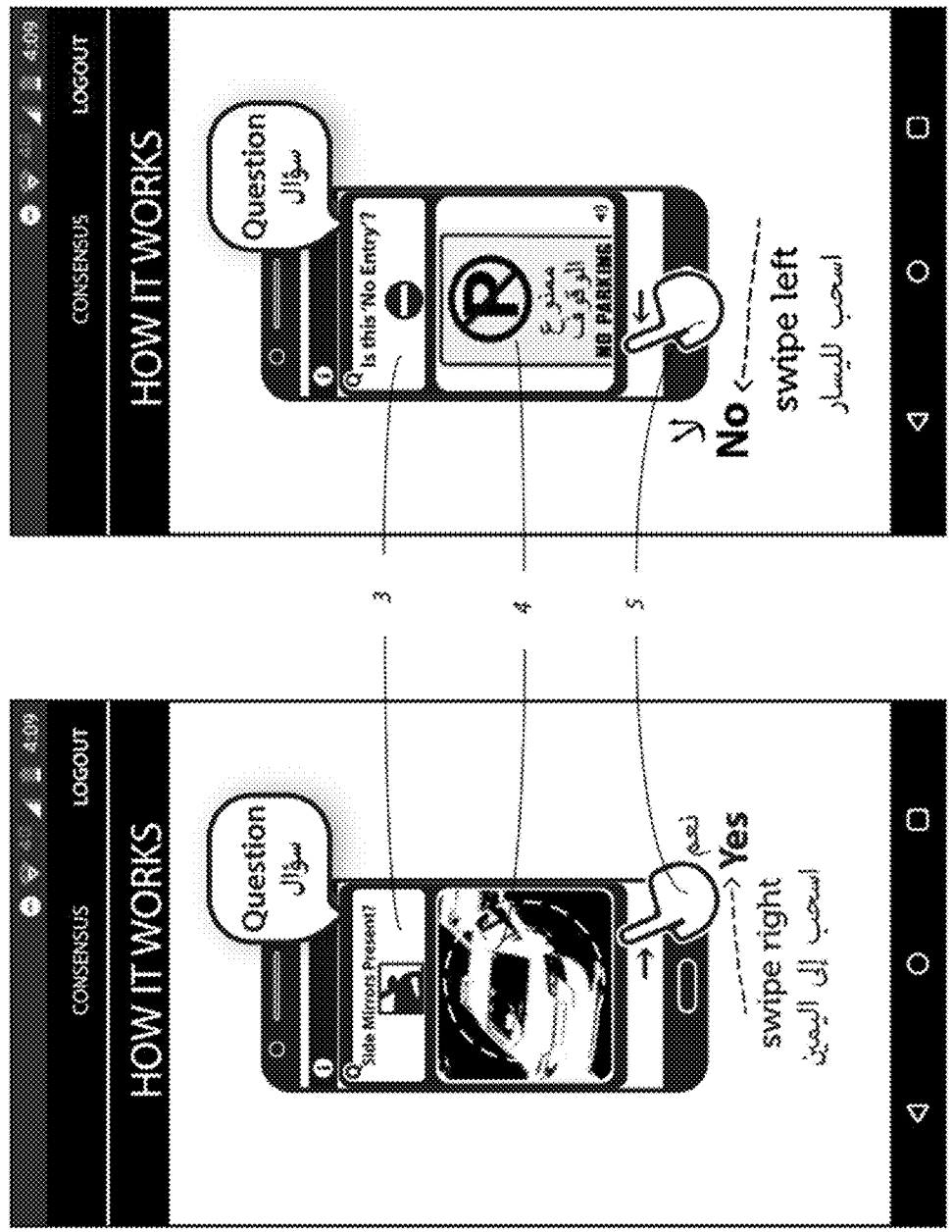
Figure 7A:
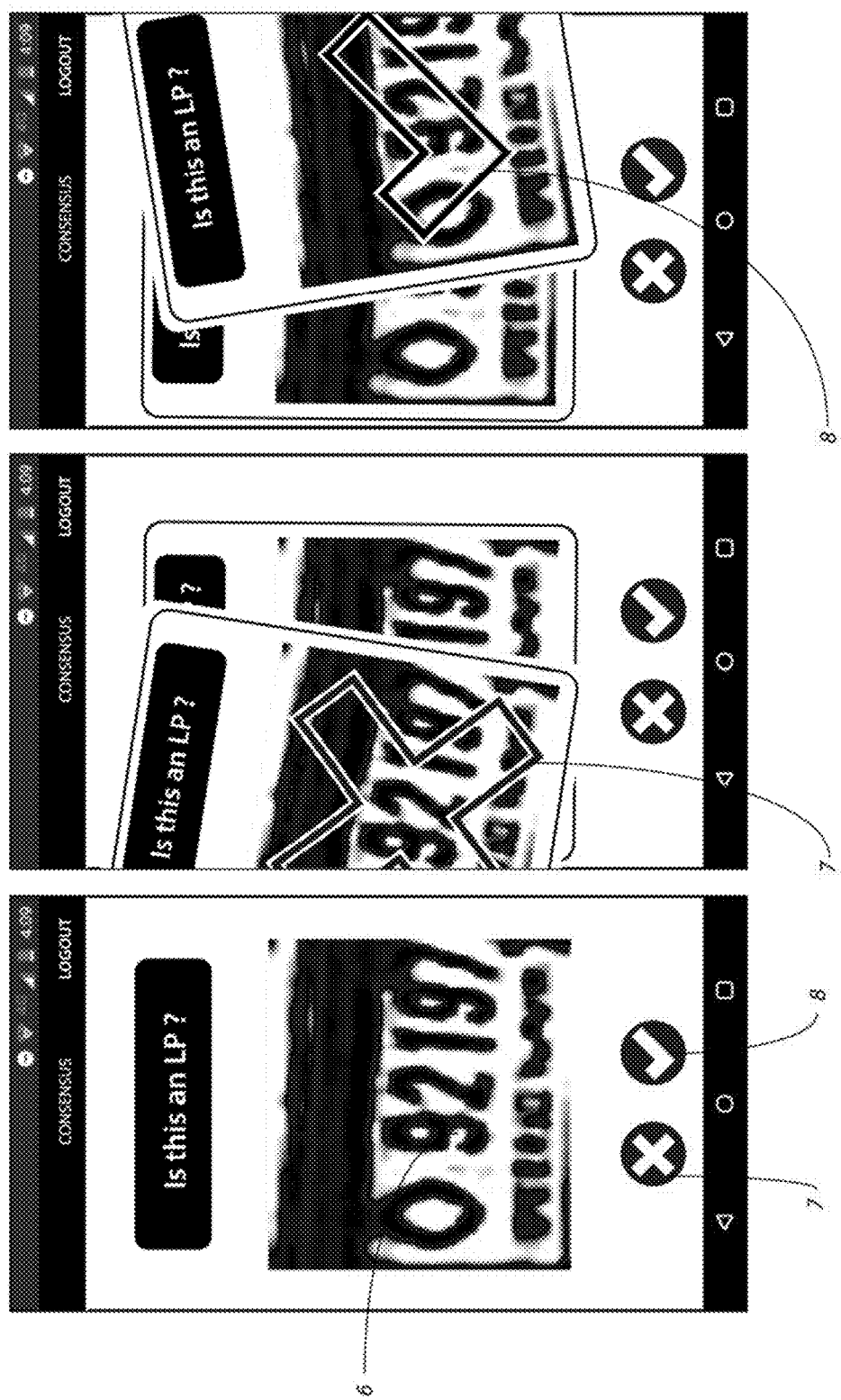

FIG. 7 and FIG. 7A illustrates a SWIPING mode providing a facility to input/annotating the images, in accordance with embodiments of the present disclosure, in accordance with embodiments of the present disclosure.

FIG. 8 illustrates an INPUT mode providing a facility to input/annotating the images, in accordance with embodiments of the present disclosure.

Figure 9:
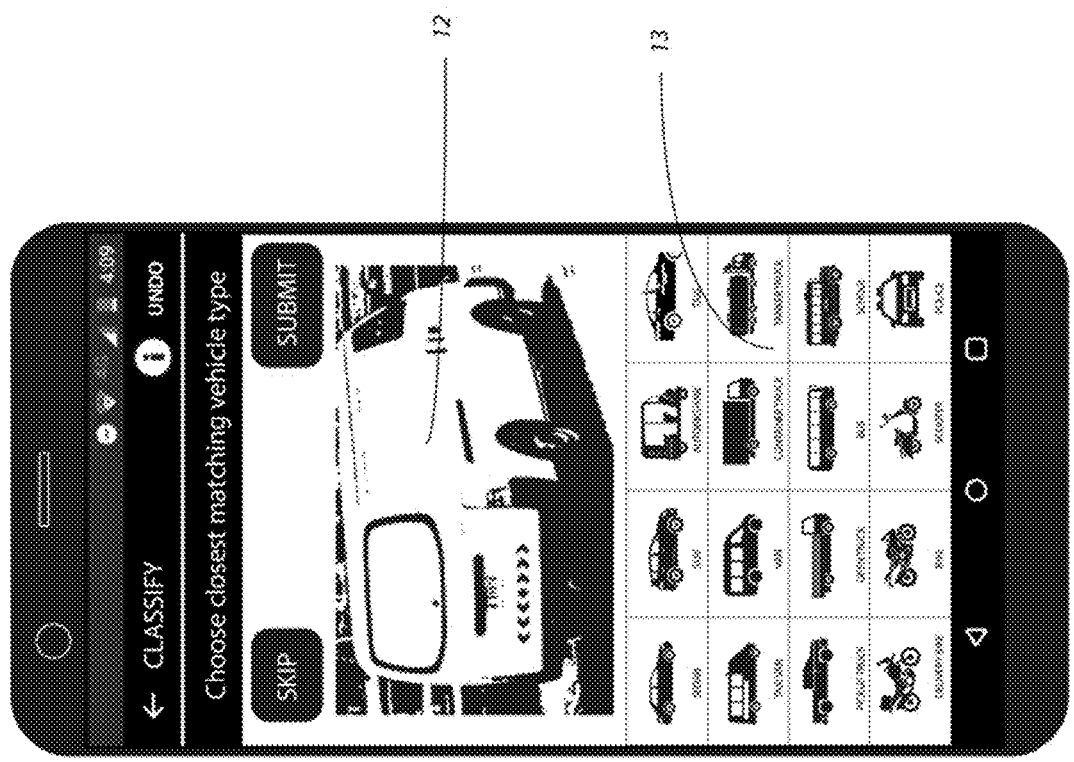

FIG. 9 illustrates a CLASSIFY mode providing a facility to classify the images, in accordance with embodiments of the present disclosure.

Figure 10:
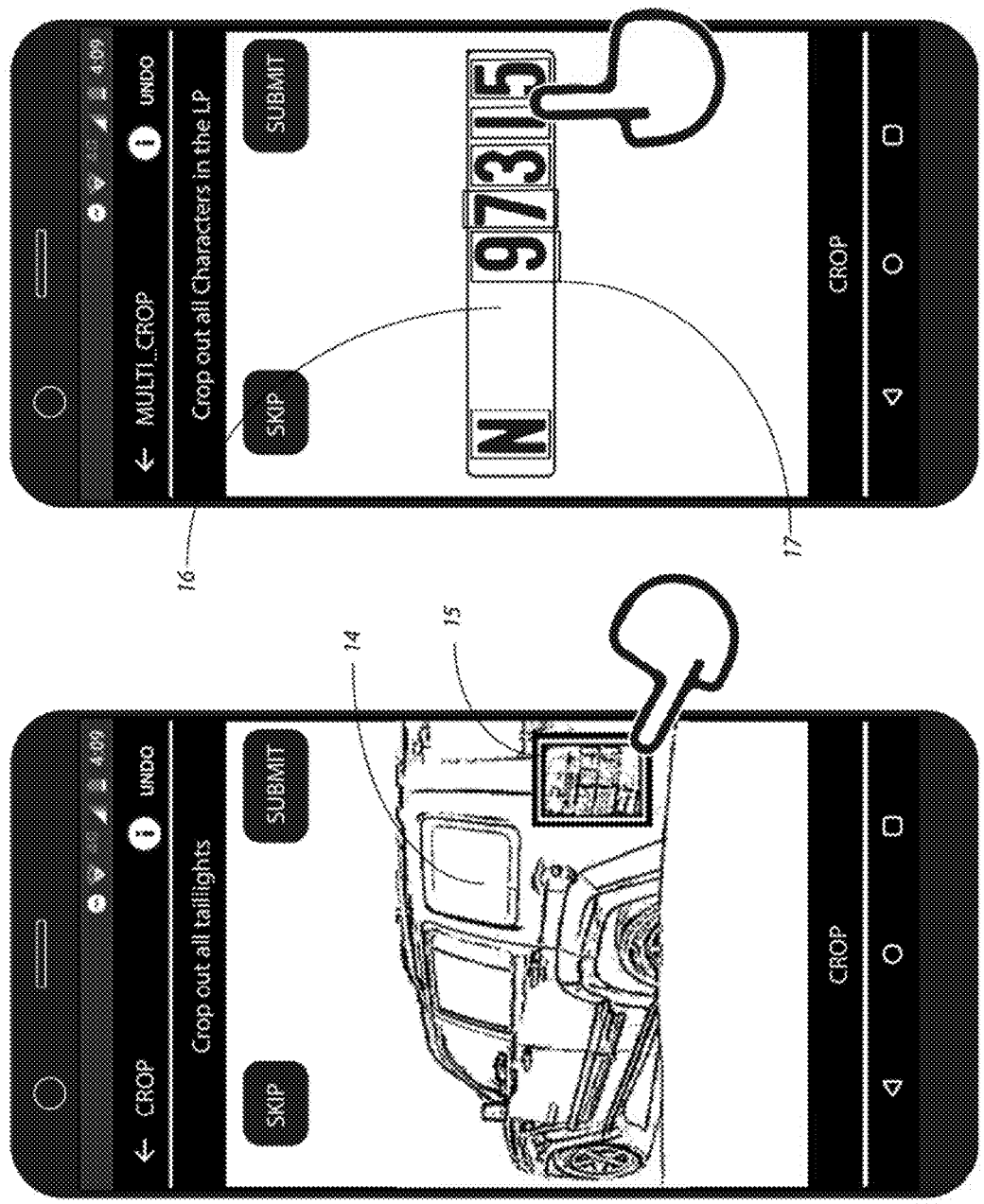

FIG. 10 illustrates a CROP mode providing a facility to crop the images, in accordance with embodiments of the present disclosure.

Figure 11:
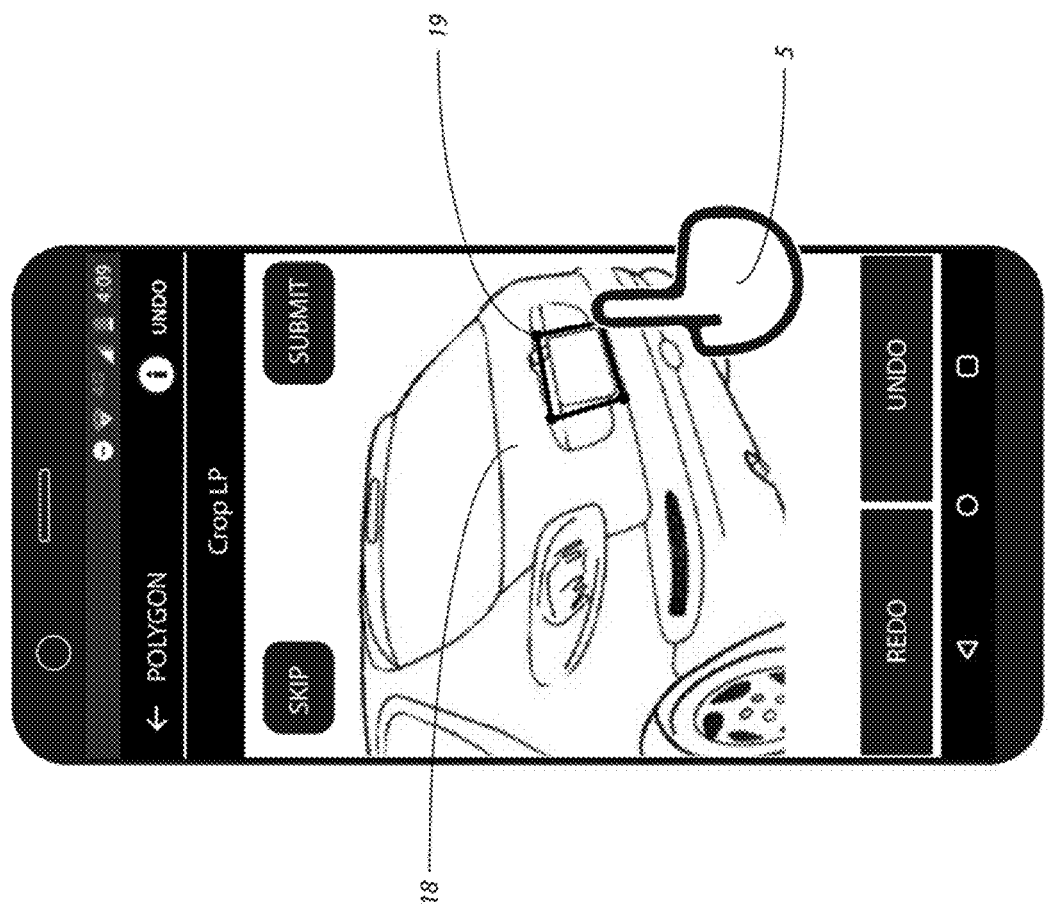

FIG. 11 illustrates a POLYGON mode used to draw polygons with irregular sides, in accordance with embodiments of the present disclosure.

Figure 12:
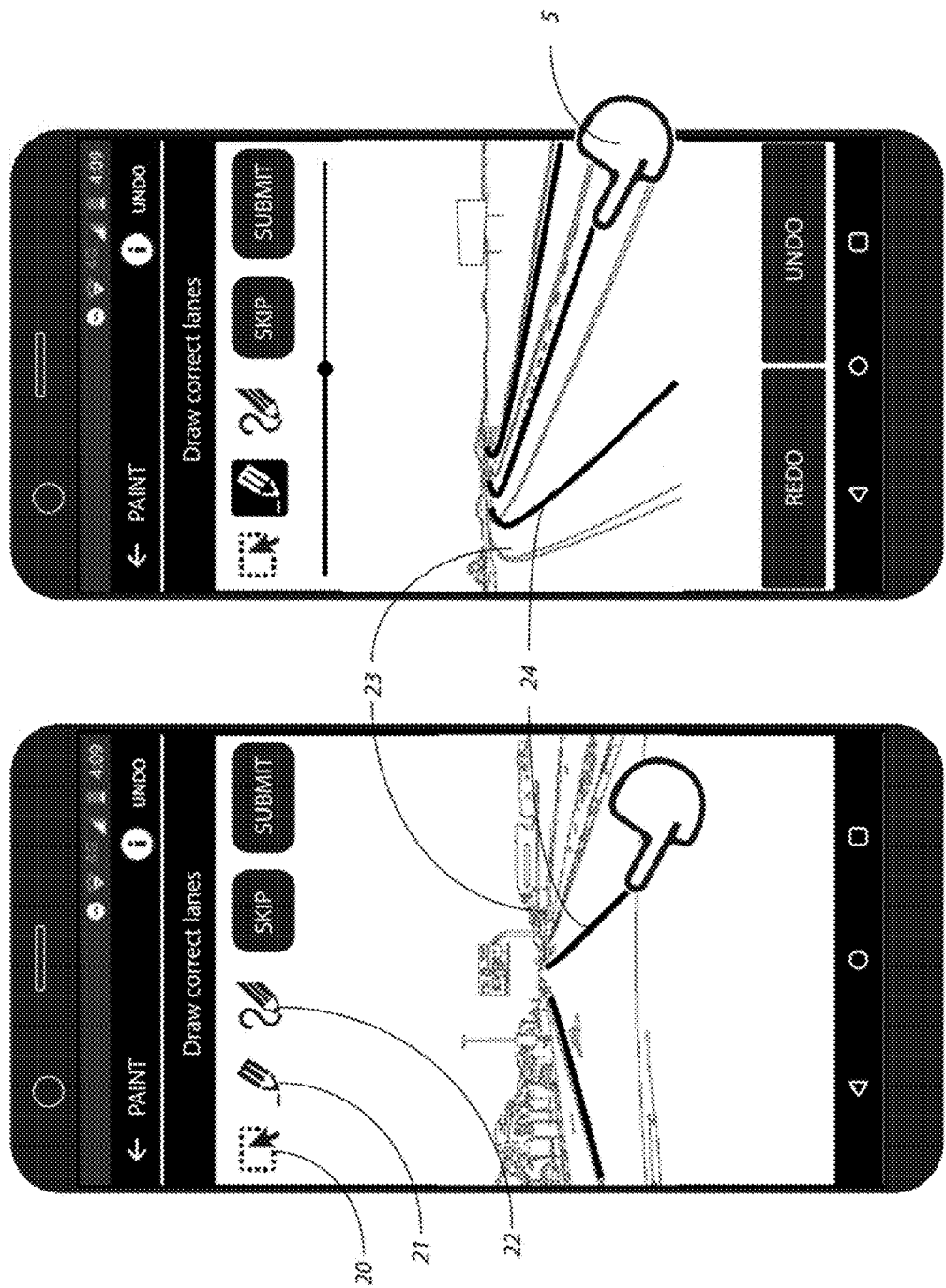

FIG. 12 illustrates a LINE mode used to annotate objects which can be represented by a line or a curve, in accordance with embodiments of the present disclosure.

Figure 13:
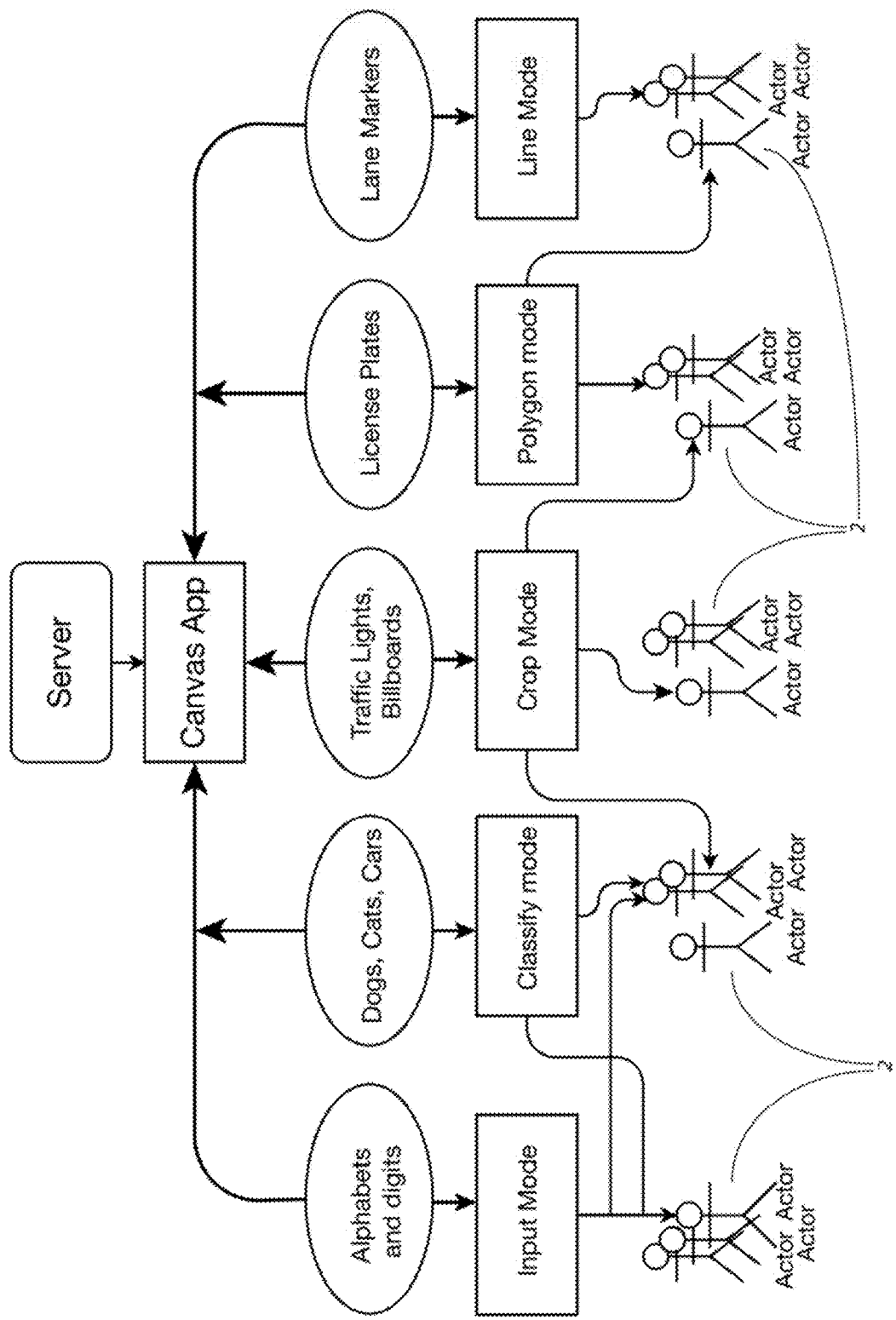

FIG. 13 illustrates a server containing all the images are pushed to the canvas app, in accordance with embodiments of the present disclosure.

Figure 14:
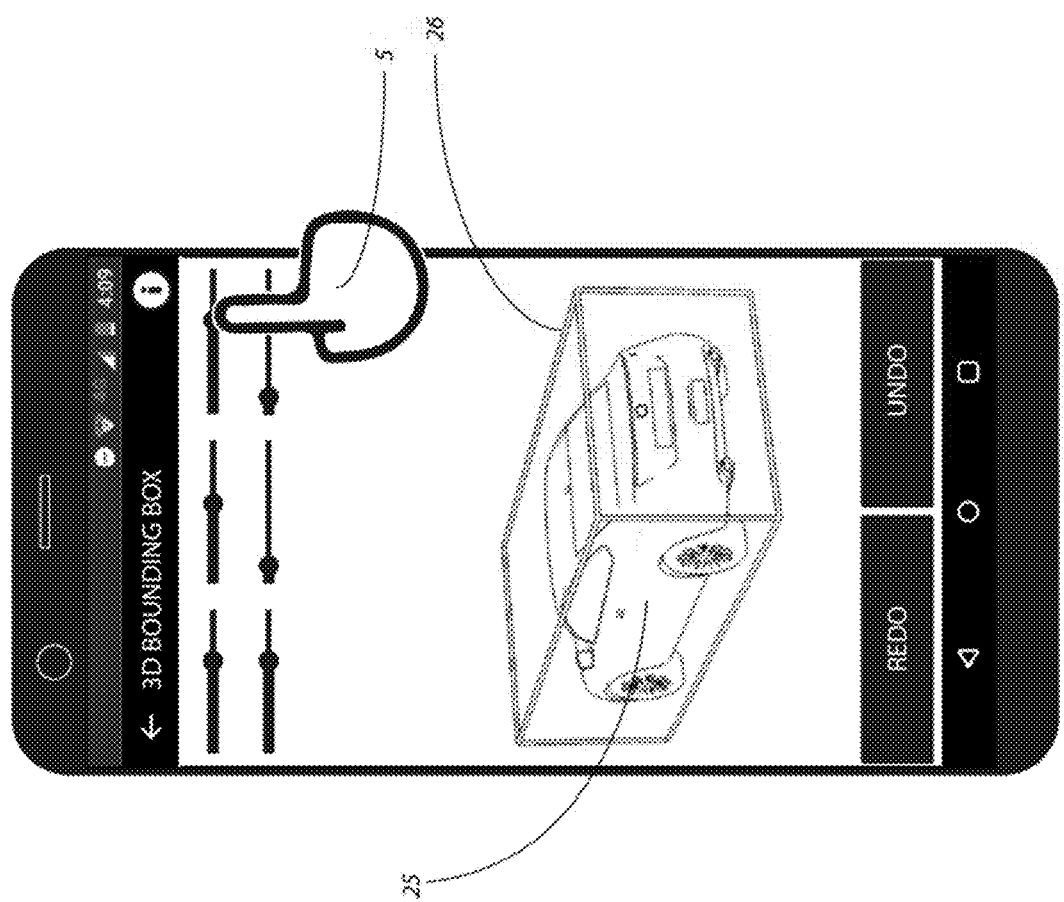

FIG. 14 illustrates a 3D bounding box of the canvas app, in accordance with embodiments of the present disclosure.

Figure 15:
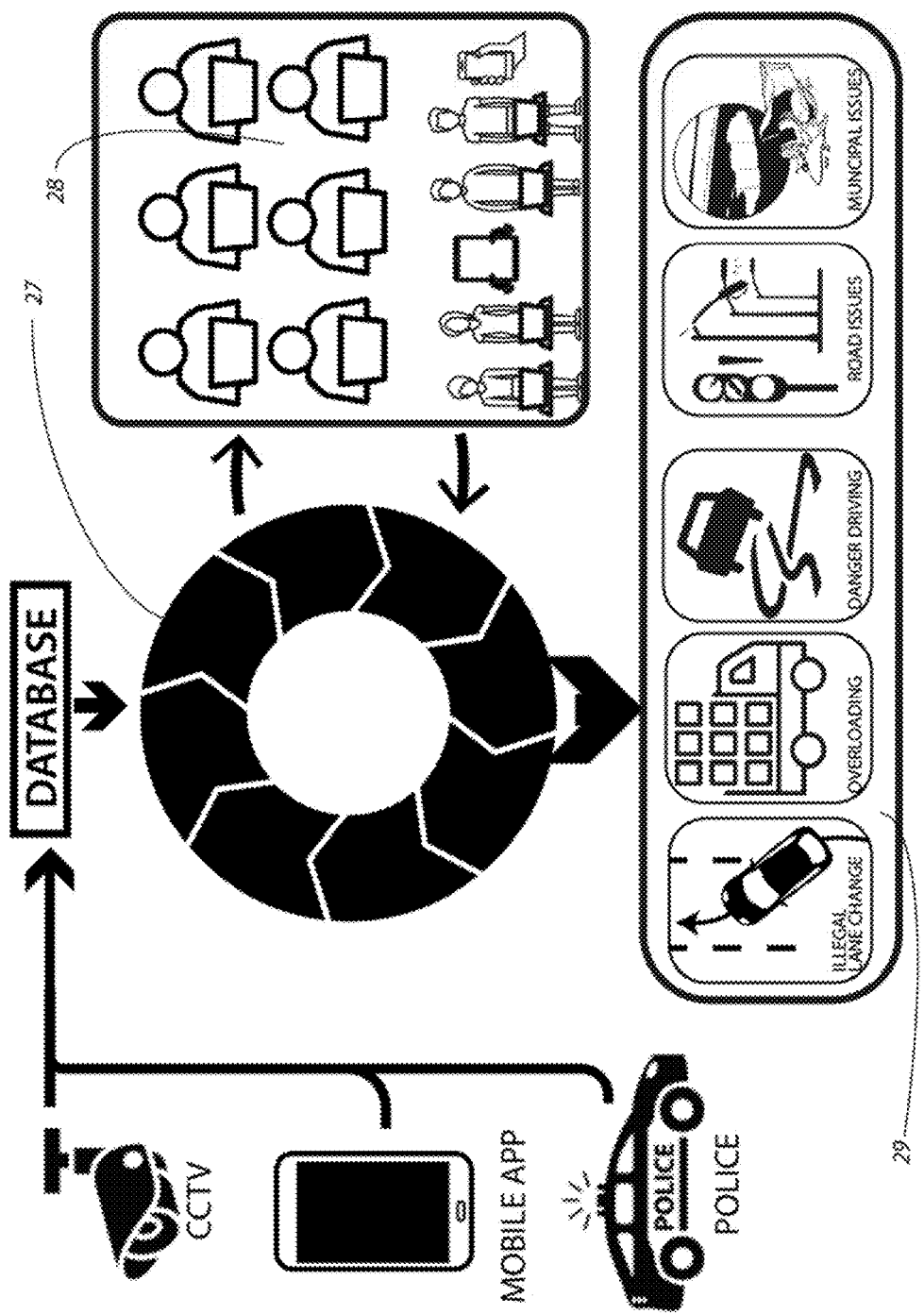

FIG. 15 illustrates an architecture of the decentralized verification network, in accordance with the embodiments of the present disclosure.

Figure 16:
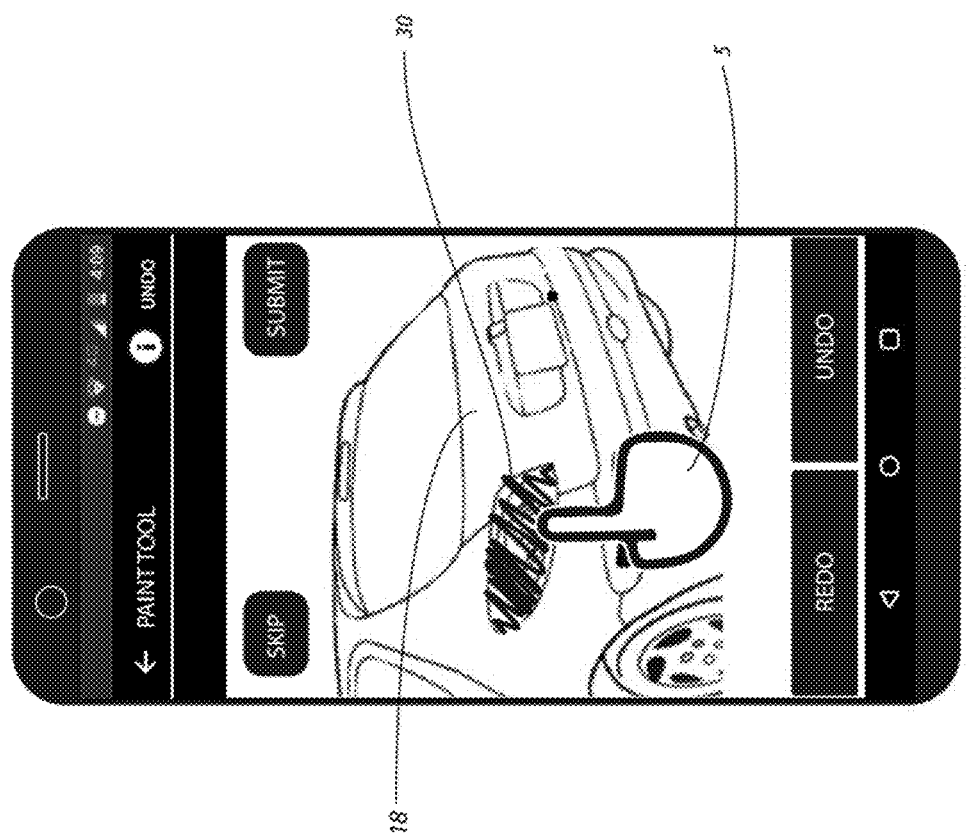

FIG. 16 illustrates a paint tool of the canvas application, in accordance with embodiments of the present disclosure.

Figure 17:
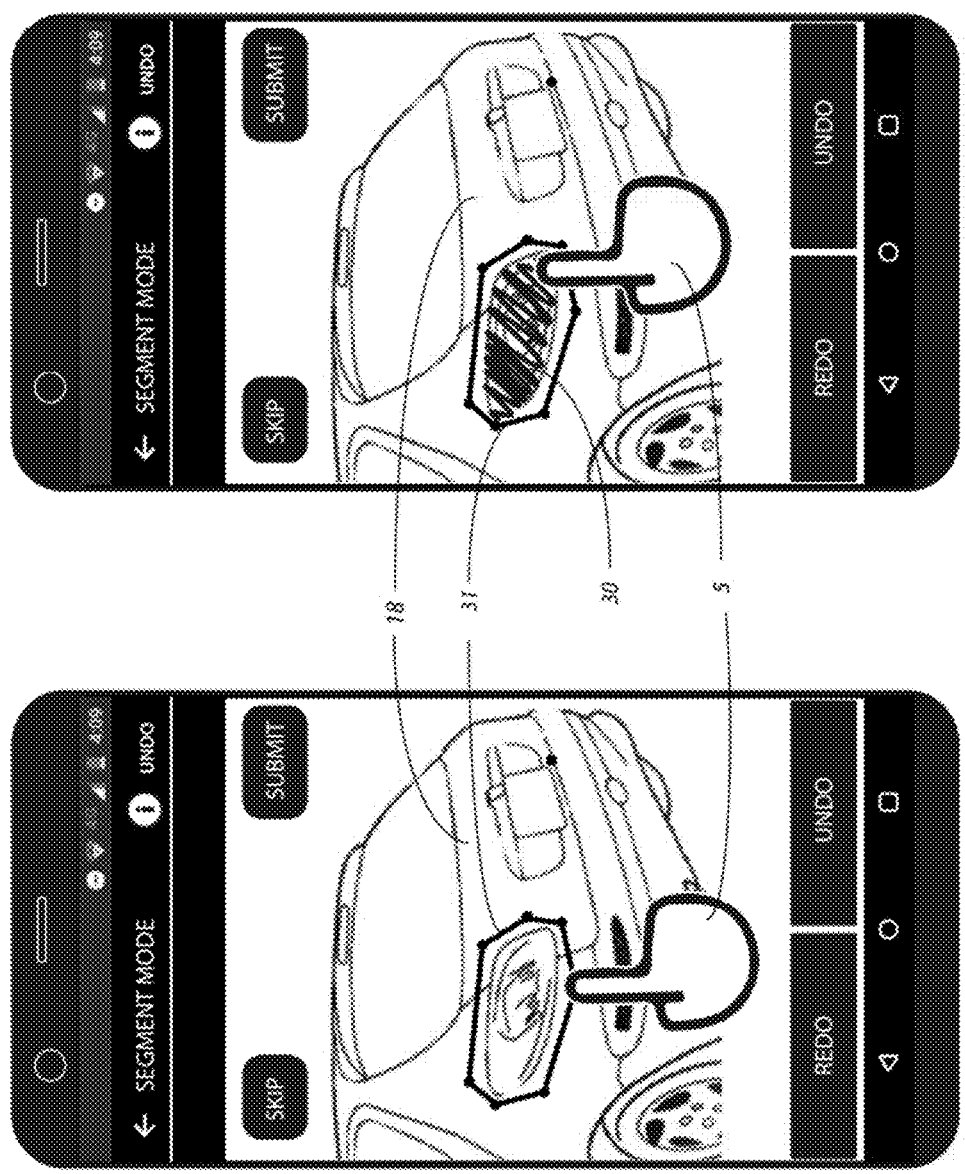

FIG. 17 illustrates the segment mode of the paint tool of the canvas application, in accordance with embodiments of the present disclosure.

Figure 18:
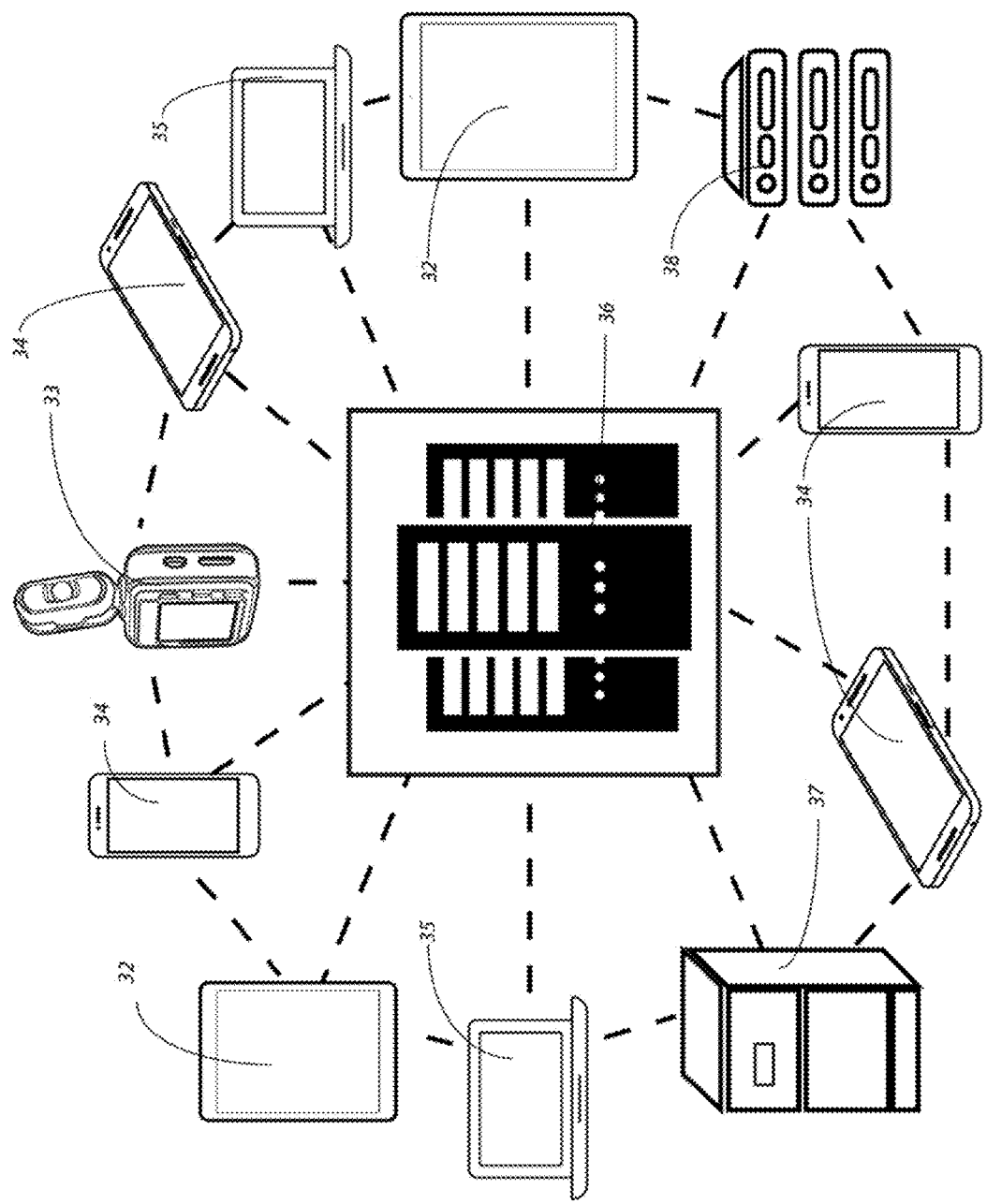

FIG. 18 illustrates the various components of the decentralized network, in accordance with the embodiment of the present disclosure.

Figure 19:
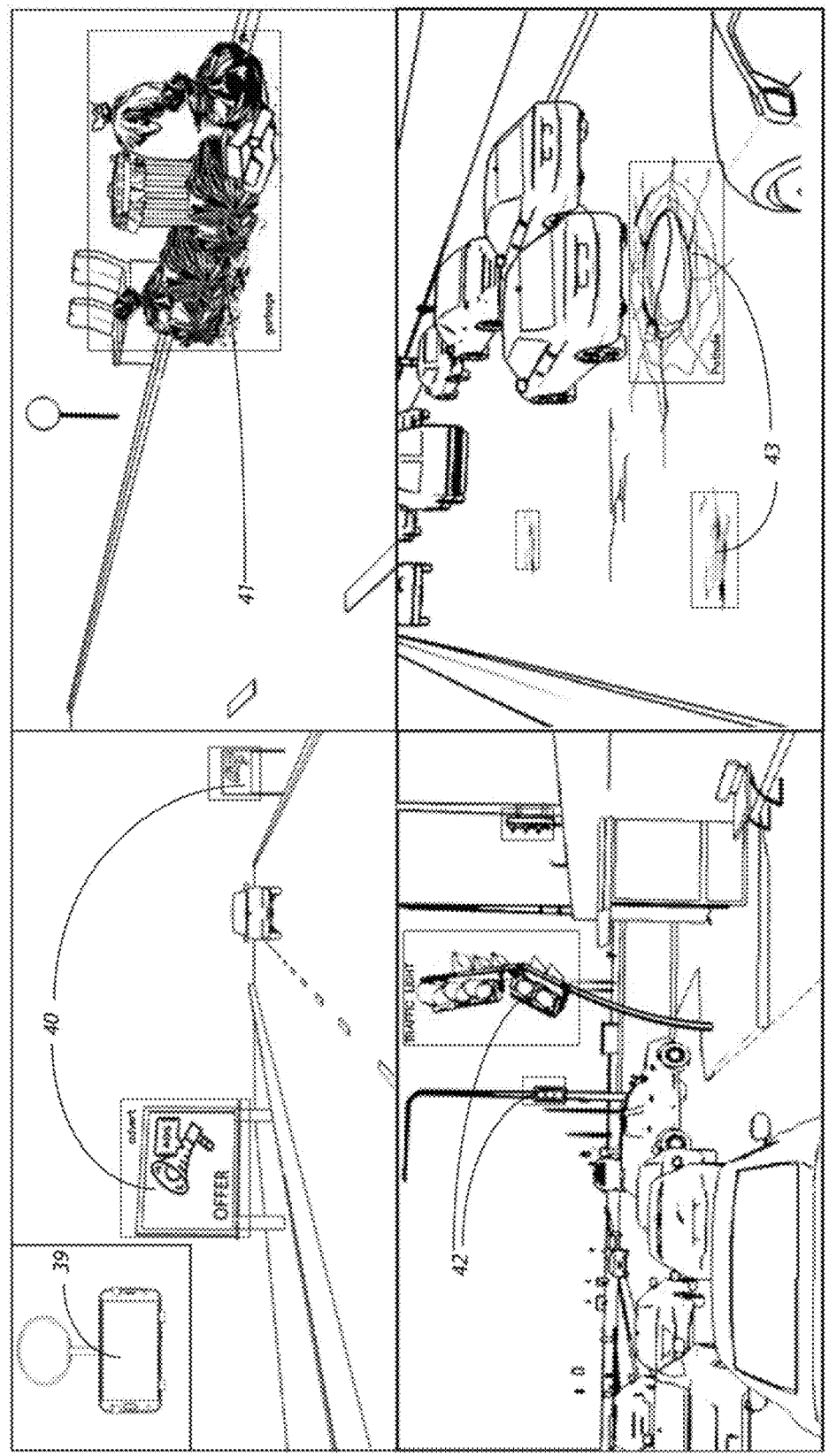

FIG. 19 illustrates the various events captured by the user's phone utilizing an image processing technique and importance of infrastructure planning, in accordance with the embodiment of the present disclosure.

Figure 20:
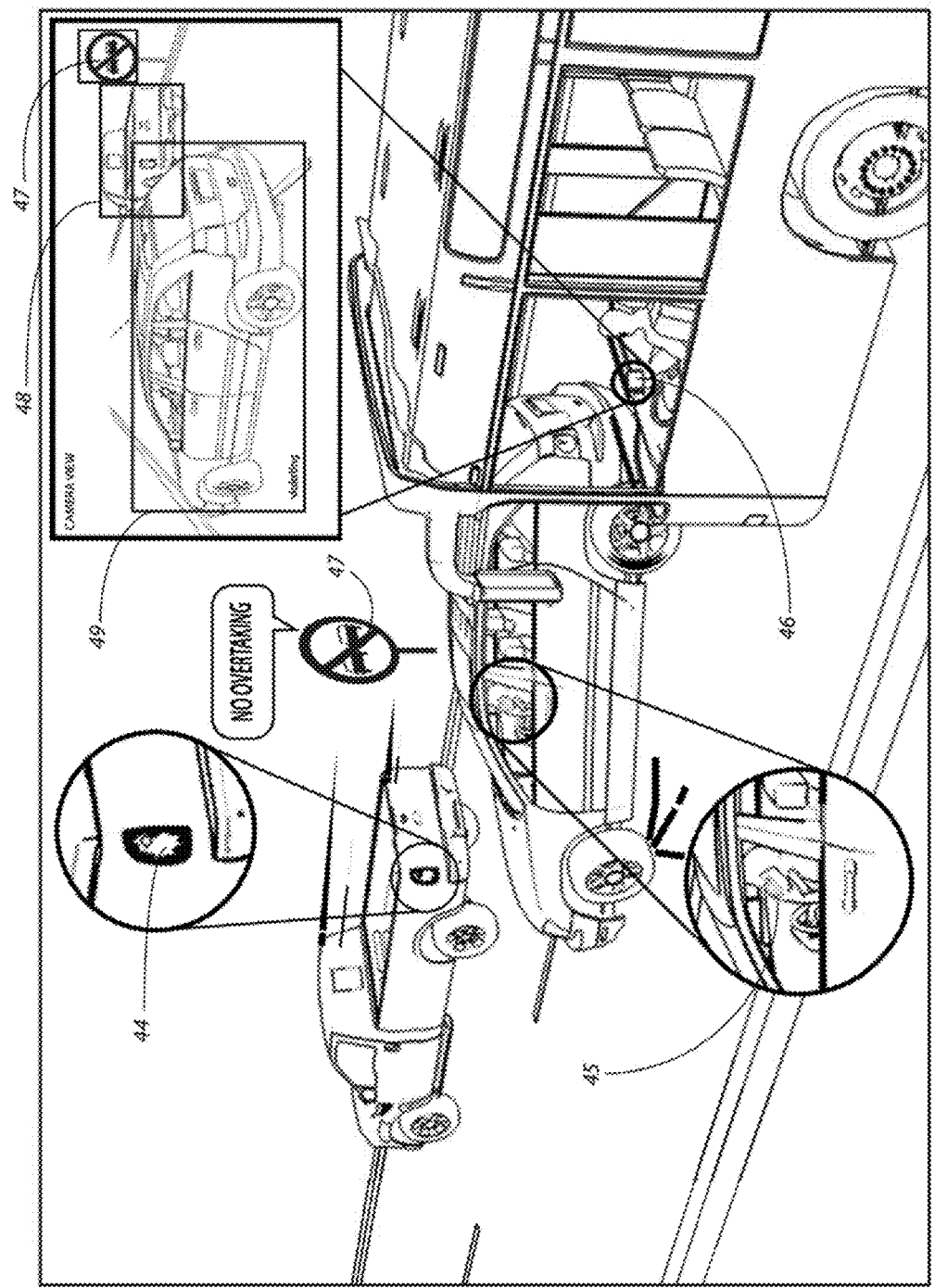

FIG. 20 illustrates the simultaneously capturing of road events, in accordance with the embodiment of the present disclosure.

DETAILED DESCRIPTION

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined below, it should be given the broadest definition persons in the pertinent art have given that term as reflected in printed publications and issued patents at the time of filing.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

Data transmission or data communication is the transfer of data over a point-to-point or point-to-multipoint communication channel. Examples of such channels are copper wires, optical fibers, wireless communication channels, storage media and computer buses. The data are represented as an electromagnetic signal, such as an electrical voltage, radiowave, microwave, or infrared signal.

The AI and human consensus based verification network has been architected in such a way as to allow any device with an interactive display to connect to it easily using an app and begin with the verification task. A central server hosts all data which have been churned out by the AI system and are sent to individual devices which are connected to the network.

The terms "configured to" and "programmed to" in the context of a processor refer to being programmed by a set of software instructions to perform a function or set of functions.

The following discussion provides many example embodiments. Although each embodiment represents a single combination of components, this disclosure contemplates combinations of the disclosed components. Thus, for example, if one embodiment comprises components A, B, and C, and a second embodiment comprises components B and D, then the other remaining combinations of A, B, C, or D are included in this disclosure, even if not explicitly disclosed.

Embodiments of the present disclosure provide a technological solution to a major and common problem of inefficient and illegal parking.

Traditional methods of model redeployment do not include a crowdsourced consensus for the task of data collection and annotation. Traditional methods rely much on data experts for data collection and model parameters monitoring. With the advent of Artificial Intelligence in the modern technology era, classifying and detecting new objects visually in a scene is only limited by the amount of data available for training a particular neural network. Manual methods of annotating visual data required a lot of manpower and time.

The present invention tries to incorporate the capabilities of neural networks for underlying an initial set of results based on which further annotations are performed.

This invention involves two components:

Component 1: Creating a new object detector/Classifier from scratch, using data from agnostic source and training and deploying it to production using a crowdsourced data annotation and performance evaluation approach.

It is essential for AI systems to be robust enough to accommodate new objects easily in a detection or classification pipeline. Doing it manually requires a lot of data of to be collected initially and labelled according to the class which is going to be detected or annotated to get high accuracies. In order to reduce the amount of human effort required to manually collect and build a large dataset our module instead divides the tasks into smaller components for feasibility and easy deployment.

The first step involves defining an ideal set which will be used to create the initial model to identify objects in an image with a decent confidence score. In this step we don't aim for extremely high confidence scores.

Once the initial dataset is prepared we train our neural network architecture from scratch. We take this model and perform inference on a new set of images targeting the trained object. All images with a confidence which meets a certain threshold and above is sent to a mobile application called the Consensus application. The other images are discarded a low confidence indicates the output can be significantly erroneous. This application has left and right swiping interface to assert a particular statement or negate it. This application is used to calculate the accuracy of the initial model easily by making more than two users work on the app and taking a majority vote as a metric to select the quality of the data.

All data which are marked as true are considered as good data and also used for calculating the accuracy of the current model. All false data automatically moves to another mobile application called the Canvas app.

The Canvas application is used for generating annotations of multiple types on the phone itself. The different annotation types are as: Input type (used to type in a particular class by viewing the object), Crop type (used to draw a bounding box on the object of concern in a larger frame), Classify type (used for multilabel classification).

Once the data is in the canvas application, the users can choose to label them using any of the input types given above. A majority voting scheme is present for all the types in the canvas app. This ensures that the data used for retraining the model doesn't have any wrongly labeled data point.

The data collected from both the consensus and canvas applications are fed back to the newly trained model and re-training is started. The data is split into a training and validation set in order to calculate online validation accuracy of the model. All checkpoint weight files are saved using a date timestamp which makes it easy to track the set retrained models.

If the live validation accuracy is higher than the previously calculated accuracy and the accuracy lies above a certain threshold then the retrained model is deployed for production usage. If not, then the model is used to repeat the steps above for consensus and canvas Component 2: Improving the performance of an already deployed ML/Neural Network model for a particular class.

The component 2 involves retraining an already deployed AI model in an automated fashion with least interference from humans for data distribution and retraining.

Similar to our component one, the already present model is tested on new data. All images with a confidence of 85% and above are sent to a mobile application called the Consensus application. This application has left and right swiping interface to assert a particular statement or negate it. This application is used to calculate the accuracy of the initial model easily by making more than two users work on the app and taking a majority vote as a metric to select the quality of the data.

All data which are marked as true are considered as good data and also used for calculating the accuracy of the current model. All false data automatically moves to another mobile application called the Canvas app.

Once the data is in the canvas application, the users can choose to label them using any of the input types given above. A majority voting scheme is present for all the types in the canvas app. This ensures that the data used for retraining the model doesn't have any wrongly labeled data point.

The data collected from both the consensus and canvas applications are fed back to the newly trained model and re-training is started. The data is split into a training and validation set in order to calculate online validation accuracy of the model. All checkpoint weight files are saved using a date timestamp which makes it easy to track the set retrained models.

If the live validation accuracy is higher than the previously calculated accuracy and the accuracy lies above a certain threshold then the retrained model is deployed for production usage. If not, then the model is used to repeat the steps above for consensus and canvas.

All these operations comprising of data validation and annotation are performed on a mobile. Since mobile phones are low compute devices and nearly every modern person is equipped with one, it becomes feasible to distribute the data amongst people having a mobile phone. This distribution of data makes it easier to get the data validated and annotated due to the consensus mechanism present. The android application can also be used to monitor the entire process of data being fetched from the server to being sent back to the servers for the AI system to be able to train on it and deploy it automatically.

FIG. 1 illustrates how video data is continuously flowing from the different video sources, in accordance with embodiments of the present disclosure. As shown in FIG. 1, the video data is continuously flowing from the different video sources such as edge devices (Mobile phones, Camera source 1)(1), CCTV cameras (Camera source 2) (1), Drone cams (Camera source) (1), Vehicle mounted cameras (Camera source 4) (1) etc. The video data moves from the camera source to a coordinator system which performs preprocessing on the data. The coordinator system has a program running on the system which makes sure that the video data coming in meets certain requirements in terms of content in order to be moved forward for further processing by the main server. Once the coordinator is satisfied with the quality of the video, it is forwarded to different AI engines running across different servers. These AI engines perform multiple operations on the videos. The output data, produced by the AI engine is packaged and then forwarded to organizations in concern such as the Police, Traffic department, Municipality and other data aggregators. The organizations then use this data for further analysis in different domains.

FIG. 2 illustrates how the videos are processed by the AI engines spread across multiple servers, in accordance with embodiments of the present disclosure. As shown in FIG. 2, Video data acquired by the different camera sources can contain multiple objects. In order to process this data in parallel, the videos are first broken down into constituent frames which are then forwarded to these different AI engines performing operations such as Vehicle Detection, Lane Detection, and Pedestrian Detection. There are multiple levels of data processing in the system. For example, the vehicle detection data which was obtained in the first step is then forwarded to another engine which performs a task such as tail light or indicator light detection. Similarly, pedestrian detection in the first step is followed by detections such as 'Pedestrian crossing detection.' Every individual engine churns out data which is forwarded to other engines as a data sharing operation. The output of the AI engines, which might include metadata, processed images, videos etc. are stored in a separate storage server and the records of the processed output is stored in a Database server.

FIG. 3 illustrates how the data is managed and stored into the different folders while being processed and fetched from the consensus and canvas applications, in accordance with embodiments of the present disclosure. The Video Data is shown to be flowing into the AI engine continuously which then breaks the data down and processes them for different recognition and detection paradigms functioning in parallel. The output data is sent to a central server which distributes the data between two apps namely the Consensus and the Canvas app. The consensus app is mainly used for validation purpose. Users on the consensus app answer simple questions which validate the efficacy and efficiency of the AI model put to use. The canvas app on the other hand is further used to annotate raw data for different AI and ML models. Data sharing also happens between the two apps. The consensus app sends out all data to the canvas app which has been marked wrong by users (2). The annotated data is sent back to the respective AI engines for retraining. This ensures a continuous loop involving crowdsourced annotations for AI retraining.

FIG. 4 illustrates a central app known as the admin app which is used by a person to monitor the continuous crowdsourced annotation process, in accordance with embodiments of the present disclosure. The On the admin app, a person can view the available datasets to process and the status of datasets currently being processed by users on the consensus and canvas apps. The admin can also use the admin app to assign certain datasets based on priority of getting them validated, annotated and retrained. The admin app can also be used to view the performance of the AI models along with other metrics such as rate of data validation and annotation happening on the consensus and canvas apps.

FIG. 5 illustrates datasets are categorized on the server, in accordance with embodiments of the present disclosure. The Datasets are categorized based on a hierarchy which includes a main category and sub components. For example Roads will be one main category which will in turn contain sub components such as Lanes, Traffic Lights, Pedestrian crosswalks etc. Another main category can be Number Plate recognition which includes all the components needed to accomplish this task for example Vehicles, License Plates, Alphabets, and Digits. Datasets can selectively push to the Consensus and Canvas loop.

FIG. 6 illustrates workflow deciding how a particular dataset will propagate through the consensus and canvas apps and through which modes, in accordance with embodiments of the present disclosure. The workflow is the steps deciding how a particular dataset will propagate through the consensus and canvas apps and through which modes. Since every dataset can consist of multiple sub components and each sub component might go through different modes on the apps. Modes include crop mode, validation mode, multi crop mode, input mode etc. Modes decide how the data is supposed to get annotated on the consensus and canvas apps. For example, for the roads dataset, the component images will propagate the multi crop and polygon mode on the canvas apps. The workflows can be preset on the admin app automating the entire dataset flow.

Modes on the consensus and canvas include the validation mode on the consensus app which is used to validate the output of the AI system. The validate mode on the consensus app comes with simple question such as "Is this a vehicle ?", "Is this a traffic light ?" to which users just have to reply YES or NO with a swipe left or swipe right gesture. On the canvas app multiple modes are present which include the input mode where the user inputs a correct label for a data point using the keyboard. In the crop or multi crop mode the user is able to draw rectangle bounding boxes on the screen around a certain object of interest using a touch interface on the app.

FIG. 7 and FIG. 7A illustrates a SWIPING mode providing a facility to input/annotating the images, in accordance with embodiments of the present disclosure, in accordance with embodiments of the present disclosure. The consensus app has only one type of input mode which is the swiping mode The swiping mode allows the user to validate a particular judgment extremely fast by using their fingers (5) and simple swipe gestures on the mobile application screen (6). Questions (3) on the swiping screen are not shown at random but they are clubbed instead based on a certain label information. The labels (4) are assigned by the AI model which in turn is used in the questions to validate the output. For example: If the AI model recognizes an object as a truck, then all images labeled as truck will be clubbed together for validation. The SWIPING mode also comes with two buttons indicating a wrong answer (cross button)(7) and a right answer (tick button)(8).

The canvas app facilitates a wide variety of annotation modalities for a particular data type. The different types of modes allows the app to cover wide range of data and object types which need to be detected or recognized by deep learning algorithms. The various modes by which a user can annotate an image are described below:

INPUT MODE: FIG. 8 illustrates an INPUT mode providing a facility to input/annotating the images, in accordance with embodiments of the present disclosure. For example if the image to be annotated is an image (9) of an alphabet or a digit. The user can just type in the label using the on-screen keyboard (11) on the canvas mobile application. Since the number of classes in cases such as alphabets and digits are more hence the input mode such as keyboard for inputting text and numbers is suitable for these kinds of cases. The user can skip if the character identified is correct and/or submit after inputting the character in the input area using keyboard. The answer given by the user is shown in the answer tab. (10)

CLASSIFY MODE: FIG. 9 illustrates a CLASSIFY mode providing a facility to classify the images, in accordance with embodiments of the present disclosure. The classify mode that allows user to label/classify a particular image (12) using pictographically representation of the class which is very similar to the origin images. These labels can be small icons (13) or images (13) which belong to a particular class. This mode is useful in cases where the number of classes is less and also when the user has no prior information about the classes which can be present. For example, if the user had to annotate/label types of dogs, a visual representation of the type of dog is helpful in this case, since the user might not be having any prior knowledge about the type of dog.

CROP MODE: FIG. 10 illustrates a CROP mode providing a facility to crop the images, in accordance with embodiments of the present disclosure. These modes enable the user to crop out any part of the image (14)(15) which he/she feels corresponds to a particular object which needs to be annotated. The question asked in these modes can be of the following form: 'Find all traffic signals in the image'. For this question the user will have to crop out all the traffic signals which he sees in a particular image. The number of objects (16)(17) to be identified can vary from image to image.

POLYGON MODE: FIG. 11 illustrates a POLYGON mode used to draw polygons with irregular sides, in accordance with embodiments of the present disclosure. The polygon mode comes extremely handy when the image (18) to be annotated isn't a perfect rectangle. The polygon mode can be used to draw polygons (19) with irregular sides using fingers on the screen (5). For objects which are aligned at a particular angle polygon tool can be used to effectively mark out the object in the image.

LINE MODE: FIG. 12 illustrates a LINE mode used to annotate objects which are neither a rectangle nor any other irregular shape, in accordance with embodiments of the present disclosure. The line tool is specifically used to annotate objects which are neither a rectangle (2324) nor any other irregular shape (23)(24). Instead these are shapes which are extremely narrow and can only be annotated using by marking them out in a special manner. The line tool in the Canvas application can be used to draw lines and also modify them in order to form arcs (22) and similar shapes (22). For example, one use case of using the line tool comes when we are annotating lane markers in images. These lane markers can be extremely narrow in some cases which make it difficult for the user to use the rectangle tool. The customizable line (20)(21)(22) tool allows the user to set the pixel width of the line to be drawn and can also be modified to fit lane curvatures, using their fingers (5)

Similar to the annotation schemes defined above, other customizable annotation methods can also be added to the canvas app.

FIG. 13 illustrates a server containing all the images which are pushed to the canvas app, in accordance with embodiments of the present disclosure. As shown in FIG. 13, the server containing all the images is pushed to the canvas app. The canvas app then distributes these images to a pool of users based on the number of users (2) present and also based on the type of data to be labeled. Since all data goes through a consensus/majority voting system, the same data might go to two or more persons (2) for annotation and reviewing. This ensures that the data coming out of the canvas application is full proof and devoid of any errors.

3D Bounding Box mode: FIG. 14 shows the 3D bounding box mode which allows users to draw a 3D bounding box (26) around an object of interest (25). The 3D bounding box encapsulates the entire object in the image from all sides and allows the user to specifically understand side, top, front and rear views individually which is lacking in a 2D bounding box. Users are allowed to position the bounding box as required using their fingers (5) and simple sliders.

FIG. 15 shows how the data is distributed into a decentralized verification network (27). All devices connected to the network are nodes (28) performing computation of some form to ensure high quality data leaves the network as an end-product (29) and also makes sure that high-quality annotated data is sent back to the AI models for training.

FIG. 16 shows the paint tool which comes handy in marking (30) out irregular shapes in an image. The paint tool is helpful in providing rough approximation of objects in an image (18), using just fingers (5).

FIG. 17 shows the segment mode which is an amalgamation of the paint tool and the polygon tool. A user can mark out a complicated structure (31) using fingers (5) on the image (18) and then segment (30) the portion out using the paint tool. These kind of annotations are used for neural network models which perform the task of semantic and instance segmentation. This can also be achieved using a grab-cut technique which easily bounds various objects connected or objects to be grabbed together.

The decentralized compute network is described in FIG. 18. The data moves from the central server (36) to nodes on the distributed network. These nodes are basically mobile devices (32,34) or any digital device (33,34, and 35) connected to the Internet with access to the verification apps. Remote storage devices (37,38) can also be connected to this network for distributing the storage load. The compute cost and overhead to perform computation on a central server is reduced manifold when it is decentralized.

FIG. 19 displays how the invention can be used to collect necessary data for infrastructure planning. Proper infrastructure monitoring and planning is extremely important in order to maintain smooth flow of traffic, unhindered transportation etc. The mobile application (39) can be used to monitor appropriate position of advertisement billboards (40), broken traffic lights (42) at intersections which can cause unnecessary traffic jams, garbage (41) and wastes which have not been disposed adequately, potholes on roads (43) and many more such infrastructural errors.

The mobile app can be used to catch multiple violations happening on roads simultaneously. As shown in FIG. 20, the car in front of the bus is trying to overtake a pickup truck in an area where overtaking is not allowed. The driver inside the car is using a mobile phone (45) which is another violation. All these events have been captured by the mobile device (46) situated inside the bus. The application on the mobile device captures the vehicles (48), it's state and movement (48)(49), the tail lights (44) and indicator lights (44) and also the different road signs (47) in order to understand if the vehicles are following the road signs as required.

The Crowdsourced data annotation method described in above constitutes of three stages. The first two stages involve the validation of AI model predictions on the consensus application and the re-labeling or classification on the canvas application. The third step is basically the majority voting or implicit consensus logic that is applied to all data which is getting reviewed on these mobile applications. The major advantage of having this distributed system on the mobile platform is that the annotation platform is readily available, inexpensive and easily deployable. The continuous majority voting scheme on the system according to the present invention ensures properly annotated data to be churned out for retraining deep learning models.

In one embodiment, the proposed electronic device may include at least one processor, an input/output (I/O) interface and a memory.

The processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow system to interact with a user directly. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and data. The modules include routines, programs, and objects, components, and data structures etc., which perform particular tasks or implement particular abstract data types.

The image processing technique is the use of computer algorithms to perform image processing on digital images. As a subcategory or field of digital signal processing, digital image processing has many advantages over analog image processing. The image processing techniques utilizes image data received from electronic mobile devices or other computing devices with a camera. Image processing basically includes the following three steps: Importing the image via image acquisition tools; analyzing and manipulating the image; output in which result can be altered image or report that is based on image analysis.

In an aspect, the method implemented by the proposed artificial intelligence (A) based system may be described in general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the proposed access network selection method may be considered to be implemented in the above described the proposed electronic device.

The present disclosure relates to artificial intelligence (AI) and neural networks. More specifically relates an autonomous crowdsourced on-demand AI powered stewardship network.

An aspect of the present disclosure relates to artificial intelligence (AI). In particular, the present disclosure pertains to artificial intelligence based system and method for avoidance of traffic violation.

In an aspect of the present disclosure relates to an electronic device configured with one or more artificial intelligence (AI) algorithms and/or machine learning (ML) algorithms. The system includes one or more processors coupled to the non-transitory storage device and operable to execute the one or more modules.

The one or more routines includes an obtaining module, which when executed by the one or more processors, obtains, based on the one or more AI and/or ML algorithms, at least a combination of objects or events of interest from one or more vision sensing systems, wherein said combination of objects or events of interest comprises at least an image having one or more identifiable objects, and a transmit module, which when executed by the one or more processors, transits the obtained combination of objects or the obtained events of interest to one or more servers.

In an aspect, the interest is pre-defined for the electronic device.

In an aspect, the interest is pre-configured in the electronic device.

In an aspect, the interest is received in real-time.

In an aspect, the one or more servers are configured to process the obtained combination of objects or the obtained events of interest to generate at least one output.

In an aspect, the one or more AI algorithms and/or ML algorithms are configured to learn automatically and upgrade based on said combination of objects or events of interest.

In an aspect, the one or more servers are configured to perform a series of AI based inference on the obtained combination of objects or the obtained events of interest, and categorize into data points.

In an aspect, the data points are provided to one or more users for further processing.

In an aspect, an accurate result of the processing is decided based on consensus from the one or more users.

In an aspect, an accurate result of the processing is decided based on majority voting from the one or more users.

In an aspect, the one or more users receive the data points from the various AI models and the one or more users processes the data points.

In an aspect, the one or more users process the data points by classification and manual annotation techniques.

In an aspect, the one or more AI algorithms and/or ML algorithms are configured to learn and evolve based on the manual annotations by retraining e one or more AI algorithms and/or ML algorithms with more new data that is pouring into a pool of training data.

In an aspect, the manual annotation techniques are selected from any or combination of Lanes, 2D bounding polygons for various objects, Selection images, Number entry, Road segmentation, and 3D polyhedral shapes for various sides of an object to be detected.

In an aspect, the data points are provided to one or more distributed servers for further processing. This decentralized network includes several computing nodes such as mobile phone, tablets and other edge devices capable of performing operations which are required to train a AI models.

Another aspect of the present disclosure relates to a method for detecting objects in images and videos using a single deep neural network. The method can include the steps of: obtaining, based on the one or more AI and/or ML algorithms, at least a combination of objects or events of interest from one or more vision sensing systems, wherein said combination of objects or events of interest comprises at least an image having one or more identifiable objects; transmitting the obtained combination of objects or the obtained events of interest to one or more servers.

In an aspect, the one or more servers are configured to perform a series of AI based inference on the obtained combination of objects or the obtained events of interest, and categorizes into data points, the data points are provided to one or more users for further processing.

In an aspect, an accurate result of the processing is decided based on consensus or majority voting from the one or more users.

In an aspect, the one or more users process the data points by classification and manual annotation techniques.

In an aspect, the one or more AI algorithms and/or ML algorithms are configured to learn and evolve based on the manual annotations by retraining e one or more AI algorithms and/or ML algorithms with more new data that is pouring into a pool of training data.

In an aspect, the manual annotation techniques are selected from any or combination of Lanes, 2D bounding polygons for various objects, Selection images, Number entry, Road segmentation, and 3D polyhedral shapes for various sides of an object to be detected.

In an aspect, the data points are provided to one or more distributed servers for further processing. This decentralized network includes several computing nodes such as mobile phone, tablets and other edge devices capable of performing operations which are required to train a AI models.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

The foregoing object, features and advantages will be able to easily carry out self-technical features of the present invention one of ordinary skill in the art are described later in detail with reference to the accompanying drawings, accordingly. If the detailed description of the known art related to the invention In the following description of the present invention that are determined to unnecessarily obscure the subject matter of the present invention, and detailed description thereof will not be given. It will be described in the following, a preferred embodiment according to the present invention with reference to the accompanying drawings, for example, in detail. Like reference numerals in the drawings it is used to refer to same or similar elements.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. An electronic mobile device including:
one or more storage devices having embodied therein one or more routines performing AI training or inference; and
one or more processors coupled to the one or more storage devices and operable to execute the one or more modules, wherein the one or more modules include:
a capture module, which comprises one or more Image Processing techniques, which is inferencing or identifying at least a pre-defined combination of objects and/or events of interest from one or more cameras;
a receiving module, which receives the continuously updated objects and/or the events of interest on the electronic mobile device remotely from a server;
a selection module to select the one or more Image Processing Techniques on the electronic mobile device based on the complexity of the Image Processing required to process the received data from receiving module;
a data storage module, which stores a video or series of one or more images with the desired objects and/or the events of interest;
a transmitter module, which when executed by the one or more processors, transmits the obtained combination of objects and/or the obtained events of interest to one or more servers;
the one or more routines embodied on the electronic mobile device are updated based on the received updated objects and/or events.

2. The electronic mobile device of claim 1, is a smartphone device, a dashcam or any other computing device with at least a camera.

3. The electronic mobile device of claim 2, wherein object and event detection on the data captured by the electronic mobile device is done through an image processing or an Artificial Intelligence or a Machine Learning or a Deep Learning technique.

4. The electronic mobile device of claim 3, which performs a process of networked learning, wherein one or more artificial intelligence (AI) algorithms and/or machine learning (ML) algorithms on one or more electronic devices are configured to learn automatically and update the recognition of new objects and/or events of interest based on said combination of objects and/or events of interest obtained from one or more electronic devices.

5. The user of the electronic mobile device of claim 4, wherein the performance of one or more users of electronic mobile device is measured based on capturing the objects and/or events of interest.

6. A network system comprising one or more image processing algorithms and/or artificial intelligence (AI) algorithms and/or machine learning (ML) algorithms, the network system comprising scalable infrastructure, which includes:
one or more storage devices; and
one or more processors coupled to the one or more storage devices and operable to execute the one or more modules, wherein the one or more modules include:
a data storage module, which stores a video or series of one or more images with the desired objects and/or events of interest;
a processing module for making data packets and marking data points; wherein the data packets and marked data points are used for AI based training of electronic mobile devices;
a transmitter module for transmitting the data packets and the data points to a network of users for annotation and verification of objects and/or the obtained events of interest; and
a receiver module, which receives the annotated and verified object or events of interest from electronic mobile devices remotely from a user or the network of users and;
a selection module to select the one or more Image Processing Techniques on the electronic mobile device based on the complexity of the Image Processing required to process the received data from receiver module.

7. A network system of claim 6 having a decentralized network containing one or more electronic devices configured to run an application allowing the one or more electronic mobile devices to perform AI training or inference on the device itself to outsource or decentralize a part of the computing to reduce load on the network system, which includes:
a module to utilize the processing power of the one or more user's electronic mobile devices to process the data packets and/or the data points;
a transceiving module to select the one or more user's electronic mobile devices based on the complexity of the computation;
receiving the processed data packets and/or the data points from the one of more user's electronic mobile devices.

8. The network system of claim 7, wherein the performance of one or more users of the electronic devices in the decentralized network is measured based on the volume of data processed by the electronic mobile devices.

9. A network system of claim 6, further comprising an annotation module configured to run on an electronic mobile device having a visual display, wherein the annotation module comprises:
- one or more data labeling techniques for the purpose of training, or re-training AI models, or for data verification;
- one or more tools to perform one or more of operations comprising annotate, draw, label and classify the received one or more objects and/or events of interest from a remote server;
- a transmission of the annotated, drawn, labeled and/or classified objects, areas and/or events of interest back to the network system for deep learning, re-training and other AI inference improvement operations.

10. The network system of claim 9, wherein the annotation module runs on a smartphone or a tablet or on a computing device having a display with a pointing device and/or a touchscreen.

11. The network system of claim 9, wherein the annotation module can allow the verification of an inference by the AI by a swipe gesture in one or more directions or in one or more manners to provide different tags to the data, wherein the swipe gesture comprises one or more of a gesture in one direction of the swipe for confirming a 'Correct' Inference and a gesture in another direction of the swipe for confirming an 'Incorrect' Inference by the AI running on the network system.

12. The network system of claim 9, wherein the annotation module comprises an input mode for labeling the objects of interest by typing labels such as alpha-numeric characters directly using a keyboard or a key pad.

13. The network system of claim 9, wherein the annotation module comprises a bounding box mode for drawing multiple bounding boxes over objects or areas of interest in an image using a single or a multiple fingers gestures or the pointing device.

14. The network system of claim 9, wherein the annotation module comprises a polygon mode which allows the user to draw multiple polygonal shapes with multiple sides for demarcating objects or areas of interest in an image.

15. The network system of claim 9, wherein the annotation module comprises a line tool or a curve tool for drawing straight lines as well as arcs, in an image, over lanes and demarcations on a roadway or the one or more objects and/or events of interest.

16. The network system of claim 9, wherein the annotation module contains a paint tool to enable the users to paint or shade or color the one or more objects and/or events of interest in an image using their fingers or a pointing device.

17. The network system of claim 9, wherein the annotation module comprises a segmentation tool to enable the users to accurately mark out segments in an image by marking the boundary of the object by making a free-hand or grab-cut technique to enable users to comfortably demarcate a connected object or series of objects or regions or sections or events of interest.

18. The network system of claim 9, wherein the annotation module comprises a 3D bounding box tool to allow the users to draw one or more 3D polyhedral shapes around the objects of interest in an image such that different side views of the objects are represented by different surfaces of the polyhedrals.

19. The network system of claim 9, wherein the annotation module comprises a classification mode which allows the users to label the objects by selecting one or more options displayed in the form of small icons such that the user can pick the labeling options that matches closest the object or event of interest shown on a display.

20. The network system of claim 19, allowing various objects or region of interest for annotating objects, events and region of interest in the image containing infrastructure like roadways, pipelines, buildings, ports, bridges and others, and/or containing objects, people and areas of interest in urban and rural environments like museums, farmlands and other areas and objects which can be visually observed and discerned by a user.

21. The network system of claim 20, measures the performance of a user or network of users of the electronic devices for correct or accurate annotation or labeling or inferring.

22. The network system of claim 9, wherein the annotation module can allow the verification of an inference by the AI running on Server.

23. The network system of claim 22, which receives the annotation and verification from various electronic mobile devices of users and then makes a determination on the accuracy or correctness of the data by using majority voting or consensus on the data, wherein more users providing similar annotations or verifications results in higher accuracy of the data; wherein the data is fed to an AI/ML re-training algorithm and the verified data or combination of data sets are assembled together to generate a final report about an incident or an event such as a traffic violation.

* * * * *